US012704610B2

(12) United States Patent
Gautam et al.

(10) Patent No.: US 12,704,610 B2
(45) Date of Patent: Aug. 11, 2026

(54) APPARATUS AND METHOD FOR CANCELLATION OF SCATTERED LIGHT IN LIDAR SENSORS

(71) Applicant: VELODYNE LIDAR USA, INC., San Jose, CA (US)

(72) Inventors: Nutan Gautam, Los Gatos, CA (US); Liwei Hua, Los Gatos, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 937 days.

(21) Appl. No.: 17/990,434

(22) Filed: Nov. 18, 2022

(65) Prior Publication Data

US 2024/0168141 A1 May 23, 2024

(51) Int. Cl.

| | |
|---|---|
| ***G01S 7/4912*** | (2020.01) |
| ***G01S 7/481*** | (2006.01) |
| ***G01S 7/486*** | (2020.01) |
| ***G01S 17/89*** | (2020.01) |
| ***G01S 17/931*** | (2020.01) |

(52) U.S. Cl.

CPC .......... *G01S 7/4918* (2013.01); *G01S 7/4816* (2013.01); *G01S 7/4868* (2013.01); *G01S 17/89* (2013.01); *G01S 17/931* (2020.01)

(58) Field of Classification Search

CPC ..... G01S 7/4876; G01S 7/4918; G01S 7/4868

See application file for complete search history.

(56) References Cited

U.S. PATENT DOCUMENTS

| | | | | |
|---|---|---|---|---|
| 2013/0208257 | A1* | 8/2013 | Dyer | G01S 17/10 356/4.01 |
| 2016/0266253 | A1* | 9/2016 | Kubota | G01S 7/497 |
| 2017/0031009 | A1* | 2/2017 | Davidovic | G01S 7/4865 |
| 2019/0120960 | A1* | 4/2019 | Koga | G01S 7/4817 |
| 2020/0256961 | A1* | 8/2020 | Gaalema | G01S 7/4817 |
| 2022/0244358 | A1* | 8/2022 | Dean | G01S 7/484 |
| 2023/0161015 | A1* | 5/2023 | Jiang | G01S 7/4876 356/5.01 |
| 2024/0151825 | A1* | 5/2024 | Dupont | H03F 3/087 |

* cited by examiner

*Primary Examiner* — Christopher D Hutchens

(74) *Attorney, Agent, or Firm* — Kilpatrick Townsend & Stockton LLP

(57) ABSTRACT

An apparatus for cancellation of scattered light in lidar sensors is provided. In some embodiments, the apparatus includes a lidar device with a transmitter configured to transmit optical signals and a receiver configured to receive return signals based on the optical signals. The receiver includes a first photodetector configured to receive a first return signal and a second return signal, and generate a first electrical current in response to the first return signal and the second return signal. The receiver further includes a second photodetector configured to receive the first return signal but not the second return signal, and generate a second electrical current in response to the first return signal. The receiver also includes an amplifier configured to receive a third electrical current equal to a difference between the first electrical current and the second electrical current.

20 Claims, 23 Drawing Sheets

APPARATUS AND METHOD FOR CANCELLATION OF SCATTERED LIGHT IN LIDAR SENSORS

FIELD OF TECHNOLOGY

The present disclosure relates generally to lidar technology and, more specifically, to an apparatus and method for suppressing or eliminating internal reflections and/or stray light that can saturate lidar sensors during near-field object detection.

BACKGROUND

Lidar (light detection and ranging) systems measure the attributes of their surrounding environments (e.g., shape of a target, contour of a target, distance to a target, etc.) by illuminating the environment with light (e.g., laser light) and measuring the reflected light with sensors. Differences in laser return times and/or wavelengths can then be used to make digital, three-dimensional ("3D") representations of a surrounding environment. Lidar technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view, multiple optical transmitters and/or optical receivers may be used to produce images in a desired resolution. A lidar system with greater numbers of transmitters and/or receivers can generally generate larger numbers of pixels.

In a multi-channel lidar device, optical transmitters can be paired with optical receivers to form multiple "channels." In operation, each channel's transmitter can emit an optical signal (e.g., laser light) into the device's environment, and the channel's receiver can detect the portion of the signal that is reflected back to the channel's receiver by the surrounding environment. In this way, each channel can provide "point" measurements of the environment, which can be aggregated with the point measurements provided by the other channel(s) to form a "point cloud" of measurements of the environment.

The measurements collected by a lidar channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In some cases, lidar measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Apparatus and methods for cancellation of scattered light in lidar sensors are disclosed. In one aspect, the subject matter described herein relates to an apparatus. The apparatus includes a lidar device with a transmitter configured to transmit optical signals and a receiver configured to receive return signals based on the optical signals. The receiver includes a first photodetector (e.g., a photodiode) configured to receive a first return signal and a second return signal and generate a first electrical current in response to the first return signal and the second return signal. The receiver further includes a second photodetector (e.g., a photodiode) configured to receive the first return signal but not the second return signal and generate a second electrical current in response to the first return signal. In addition, the receiver includes an amplifier (e.g., a transimpedance amplifier) configured to receive a third electrical current equal to a difference between the first electrical current and the second electrical current.

In another aspect, the subject matter described herein relates to a method of cancelling scattered light in lidar sensors. The method includes providing a lidar device having a transmitter configured to transmit optical signals and a receiver configured to receive return signals based on the optical signals. The receiver has a first photodetector, a second photodetector, and an amplifier. The method further includes: receiving, at the first photodetector, a first return signal and a second return signal; generating, at the first photodetector, a first electrical current in response to the first return signal and the second return signal; receiving, at the second photodetector, the first return signal but not the second return signal; and generating, at the second photodetector, a second electrical current in response to the first return signal. The method also includes receiving, at the amplifier, a third electrical current equal to a difference between first electrical current and the second electrical current.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
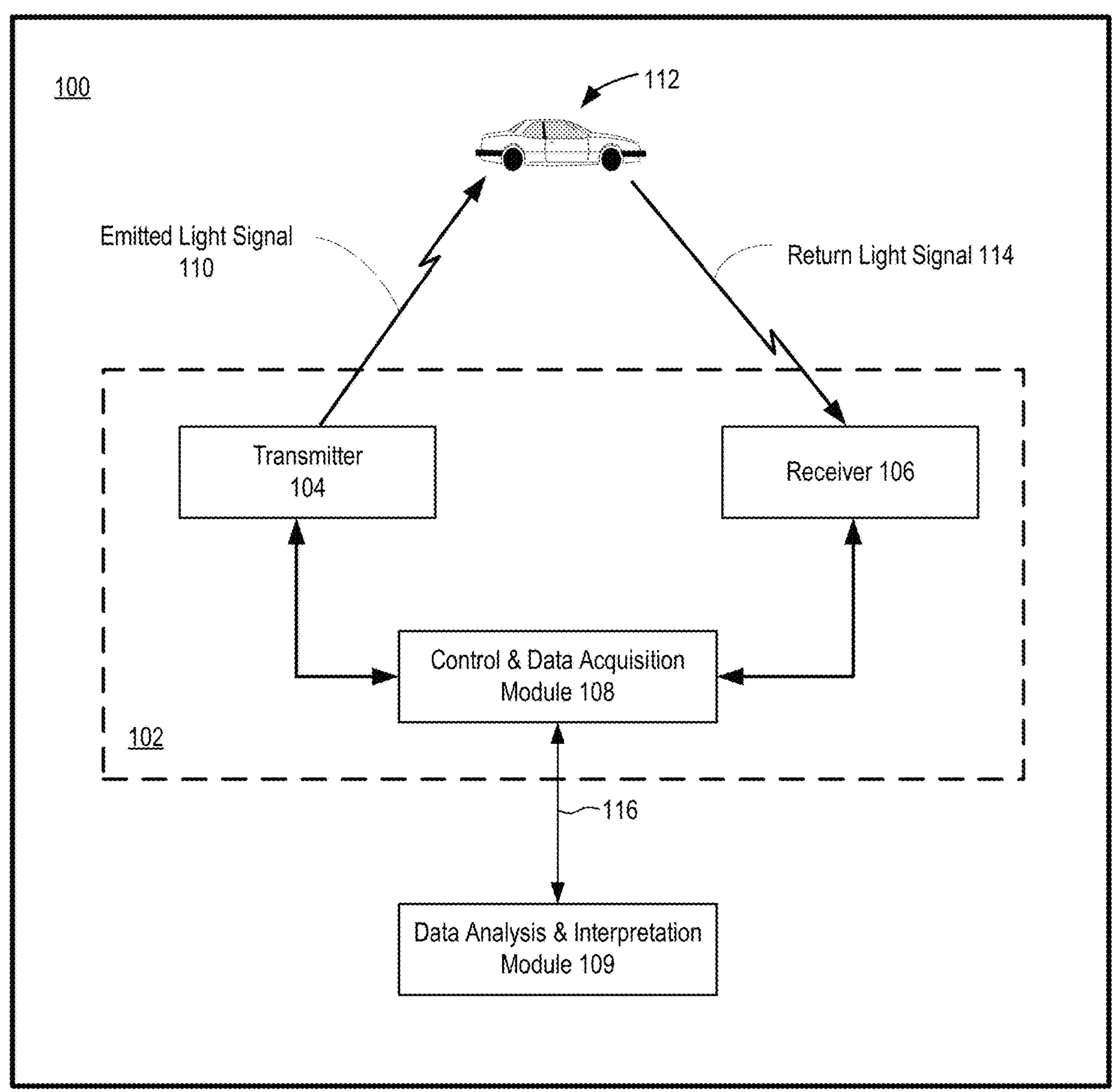
FIG. 1 is an illustration of an exemplary lidar system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Apparatus and methods for cancellation of scattered light in lidar sensors are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Three of the most significant technical challenges faced by the lidar industry are (1) reducing the manufacturing cost for lidar devices while maintaining existing performance levels, (2) improving the reliability of lidar devices under automotive operating conditions (e.g., weather, temperature, and mechanical vibration), and (3) increasing the range of lidar devices. One approach to reducing manufacturing costs is to reduce the amount of hardware (e.g., channels, transmitters, emitters, receivers, detectors, etc.) in the lidar device while increasing the utilization of the remaining hardware to maintain performance levels. One approach to improving device reliability is to develop lidar devices that use fewer moving mechanical parts (e.g., by eliminating or simplifying mechanical beam scanners). One approach to extending range is to develop lidar devices that use solid-state lasers.

In various examples, a "dazzle" or a "dazzle incident" refers to a condition where light emitted from a transmitter in a lidar device is reflected back or scattered from apertures and other edges to a receiver of the lidar device by one or more internal components of the lidar device. For example, a dazzle can be or include a reflection of light (emitted by the transmitter) off a window, enclosure, and/or other component of the lidar device. A dazzle can be or include stray light inside the lidar device. "Dazzle" may be referred to alternatively herein as "dazzle signal."

In various examples, a "dazzle width" refers to the time it takes a receiver (e.g., an avalanche photodiode (APD), a p-i-n junction photodiode (PIN), or any other suitable device) to recover from a dazzle incident. In certain instances, output from the receiver can spike or become saturated (e.g., a photodiode in the receiver can enter a breakdown region) in response to a dazzle incident, and it can take some finite time for the receiver output to return to normal levels (i.e., at pre-dazzle levels). In some examples, the dazzle width can be the time period between (i) the receiver output indicating the dazzle is first detected and (ii) the receiver output returning to normal levels e.g., within 5% or 10% of the pre-dazzle levels, according to some embodiments. In certain implementations, the receiver can be "blinded" during the dazzle width, such that the receiver may be unable to detect subsequent optical signals-such as the ones resulting from reflections originating from the environment surrounding the lidar device. The time period within which the receiver is blinded by the dazzle signal can be referred to as a "blinding period."

In certain examples, an "operating mode" refers to a power level for one or more transmitters or channels in a lidar device. Each operating mode can be associated with a respective amount of power applied to the transmitters or channels, such that the intensities of emitted optical signals can correspond to the operating mode and/or can be adjusted by changing the operating mode. Each amount of power applied to the transmitters or channels may be based on a voltage bias applied to the transmitters or channels. Each voltage bias that can be applied to the transmitters or channels may correspond to a respective voltage bias code. A transmitter in a lidar device may be selectively operable in one or more operating modes. For example, a lidar device can have a high operating mode corresponding to high power or high intensity, and a low operating mode corresponding to low power or low intensity.

Motivation for and Benefits of Some Embodiments

As described herein, a transmitter in a lidar device may be selectively operable in one or more operating modes. In each operating mode, a target amount of power (Lp) (e.g., electrical power) can be supplied to the transmitter, which results in the emission of an optical signal having a particular power (Sp) (e.g., light intensity or optical power). The transmitter can be configured with a plurality of operating modes for detection of a wide variety of objects positioned at varying distances within a field of view (hereinafter "FOV") of the lidar device. The lidar device may include one or more transmitter-receiver optical subassemblies (TROSAs) configured to detect the objects located in a near-field (e.g., between 0.1 and 2 m range) and/or in a far-field (e.g., between 2 and 200 m range). A TROSA may include one or more channels, where each channel corresponds to a transmitter-receiver combination.

To detect objects in a lidar device's FOV, a transmitter of a channel may emit an optical signal and a corresponding receiver of the channel may detect one or more return signals reflecting from one or more objects in the FOV of the lidar device. However, in some cases, the lidar device may emit an optical signal and may receive a return signal reflected from an enclosure (e.g., a window, housing, etc.) of the lidar device (e.g., a dazzle or dazzle signal). For example, a window of a lidar device may reflect a portion of an emitted optical signal back to a receiver. The intensity and/or timing of the received dazzle signals may depend on a variety of factors, including but not limited to, the positioning (e.g., direction and location) of the channel within the enclosure, the reflectance of the enclosure, and/or manufacturing tolerances of the components of the lidar device.

In various examples, the receiver can receive the dazzle signal in a time period shortly after the emission of the optical signal, such that the lidar device can be blinded by the dazzle and may be unable to detect objects in the near-field. During a dazzle incident, the dazzle signal can cause a spike or saturate the receiver's output signal, and it can take time for the receiver's output signal to return to normal levels (i.e., to recover from the dazzle event). A width or duration of the blinding period (i.e., the dazzle width) may range from about 2 ns to about 15 ns, which can be larger than or comparable to the time it takes for the return signal reflected from objects in the near-field (e.g., 0.1-2 m range) to be detected by the receiver. Therefore, and during a dazzle event, the lidar device may be unable to detect near-field objects. Accordingly, near-field performance (e.g., detection of range and intensity data) of the lidar device may suffer due to presence of dazzle signals reflected from the device's enclosure.

An inability to identify near-field objects can cause systems that rely on lidar devices for accurate object detection to fail. For example, in the context of autonomous navigation, the inability to identify objects can lead to the use of low-resolution and/or inaccurate measurements of range and/or reflectance, which can cause an autonomous vehicle to navigate inefficiently or even collide with objects in the environment based on the lack of accurate environmental data. Thus, there is a pressing need for improved techniques to minimize the adverse effects of dazzle signals detected by lidar devices, so that near-field object detection can be improved.

In response to the aforementioned limitations and challenges, in various examples, the disclosure described herein relates to an apparatus and a method for reducing or substantially eliminating the adverse effects of dazzle incidents on a receiver's output in a lidar device. In some embodiments, this is accomplished using a pair of photodetectors in one or more channels of the receiver. A first photodetector (e.g., a photodiode) in the pair can detect (i) a dazzle (e.g., a reflection/scattering of an optical signal off a component inside the lidar device, or an "internal reflection") and (ii) a reflection of an optical signal off an object in an environment outside the lidar device (e.g., an "external reflection," optionally referred to herein as a "valid return signal"), to produce a first current $I_1$. The second photodetector (e.g., a photodiode) in the pair can detect the dazzle but is generally unable to detect or receive the valid return signal, and the second photodetector produces a second current $I_2$. The second current $I_2$ (attributed to the dazzle) can then be subtracted (e.g., using a differential circuit) from the first current $I_1$ (attributed to the dazzle and the valid return signal) to remove the contribution or effect of the dazzle (or other common mode signals, such as an interference signal from surrounding sensors or a signal arising from ambient light in the sensor's environment). The resulting current, $I_1-I_2$, is attributed to the valid return signal (not the dazzle) and is fed to a transimpedance amplifier (a current-to-voltage converter hereinafter referred to as "TIA"), which outputs a voltage corresponding to the valid return signal.

Advantageously, by removing the effect of the dazzle in this manner, saturation of the TIA by the dazzle (e.g., the blinding period) can be avoided or eliminated. The apparatus and methods described herein can considerably improve an ability of a lidar device to detect near-field objects. For example, use of the photodetector pair can enable detection of objects that are as close as 10 cm (e.g., at 1.4% reflectivity) from the lidar device. By comparison, lidar devices that do not use the photodetector pair may be unable to detect objects any closer than about 60 cm.

Some Examples of Lidar Systems

A lidar system may be used to measure the shape and contour of the environment surrounding the system. Lidar systems may be applied to numerous applications including autonomous navigation and aerial mapping of surfaces. In general, a lidar system emits light that is subsequently reflected by objects within the environment in which the system operates. The light may be emitted by a laser (e.g., a rapidly firing laser). Laser light travels through a medium and reflects off points of surfaces in the environment (e.g., surfaces of buildings, tree branches, vehicles, etc.). The reflected (and/or scattered) light energy returns to a lidar detector where it may be sensed and used to perceive the environment.

The science of lidar systems is based on the physics of light and optics. Any suitable measurement techniques may be used to determine the attributes of objects in a lidar system's environment. In some examples, the lidar system is configured to emit light pulses (e.g., individual pulses or sequences of pulses). The time each pulse (or pulse sequence) travels from being emitted to being received ("time of flight" or "TOF") may be measured to determine the distance between the lidar system and the object that reflects the pulse. Lidar systems that operate in this way may be referred to as "pulsed lidar," "TOF lidar," "direct TOF lidar," or "pulsed TOF lidar." In some other examples, the time of flight may be calculated indirectly (e.g., using amplitude-modulated continuous wave (AMCW) structured light). Lidar systems that operate in this way may be referred to as "indirect TOF lidar" or "iTOF lidar." In still other examples, the lidar system can be configured to emit continuous wave (CW) light. The wavelength (or frequency) of the received, reflected light may be measured to determine the distance between the lidar system and the object that reflects the light. In some examples, lidar systems can measure the speed (or velocity) of objects. Lidar systems that operate in this way may be referred to as "coherent lidar," "continuous wave lidar," or "CW lidar." In a CW lidar system, any suitable variant of CW lidar sensing may be used. For example, frequency modulated continuous wave (FMCW) lidar sensing may be used.

FIG. 1 depicts the operation of a lidar system 100, according to some embodiments. In the example of FIG. 1, the lidar system 100 includes a lidar device 102, which may include a transmitter 104 that generates and emits a light signal 110, a receiver 106 that detects and processes a return light signal 114, and a control & data acquisition module 108. The transmitter 104 may include a light source (e.g., "optical emitter" or "emitter"), electrical components operable to activate (e.g., drive) and deactivate the light source in response to electrical control signals, and optical components adapted to shape and redirect the light emitted by the light source. The receiver 106 may include a light detector (e.g., "optical detector," "photodetector," or "detector") and optical components adapted to shape return light signals 114 and direct those signals to the detector. In some implementations, one or more optical components (e.g., lenses, mirrors, etc.) may be shared by the transmitter and the receiver.

The lidar device 102 may be referred to as a lidar transceiver or "channel." In operation, the emitted light signal 110 propagates through a medium and reflects off an object(s) 112, whereby a return light signal 114 propagates through the medium and is received by receiver 106. In one example, each lidar channel may correspond to a physical mapping of a single emitter to a single detector (e.g., a one-to-one pairing of a particular emitter and a particular detector). In other examples, however, each lidar channel may correspond to a physical mapping of multiple emitters to a single detector or a physical mapping of a single emitter to multiple detectors (e.g., a "flash" configuration). In some examples, a lidar system 100 may have no fixed channels; rather, light emitted by one or more emitters may be detected by one or more detectors without any physical or persistent mapping of specific emitters to specific detectors.

Any suitable light source may be used including, without limitation, one or more gas lasers, chemical lasers, metal-vapor lasers, solid-state lasers (SSLs) (e.g., Q-switched SSLs, Q-switched solid-state bulk lasers, etc.), fiber lasers (e.g., Q-switched fiber lasers), liquid lasers (e.g., dye lasers), semiconductor lasers (e.g., laser diodes, edge emitting lasers (EELs), vertical-cavity surface emitting lasers (VCSELs), quantum cascade lasers, quantum dot lasers, quantum well lasers, hybrid silicon lasers, optically pumped semiconductor lasers, etc.), and/or any other device operable to emit light. For semiconductor lasers, any suitable gain medium may be used including, without limitation, gallium nitride (GaN), indium gallium nitride (InGaN), aluminum gallium indium phosphide (AlGaInP), aluminum gallium arsenide (AlGaAs), indium gallium arsenide phosphide (InGaAsP), lead salt, etc. For Q-switched lasers, any suitable type or variant of Q-switching can be used including, without limitation, active Q-switching, passive Q-switching, cavity dumping, regenerative Q-switching, etc. The light source may emit light having any suitable wavelength or wavelengths, including but not limited to wavelengths between 100 nm (or less) and 1 mm (or more). Semiconductor lasers operable to emit light having wavelengths of approximately 905 nm, 1300 nm, or 1550 nm are widely commercially available. In some examples, the light source may be operated as a pulsed laser, a continuous-wave (CW) laser, and/or a coherent laser. A light signal (e.g., "optical signal") 110 emitted by a light source may consist of a single pulse, may include a sequence of two or more pulses, or may be a continuous wave.

A lidar system 100 may use any suitable illumination technique to illuminate the system's field of view (FOV). In some examples, the lidar system 100 may illuminate the entire FOV simultaneously. Such illumination techniques may be referred to herein as "flood illumination" or "flash illumination." In some examples, the lidar system 100 may illuminate fixed, discrete spots throughout the FOV simultaneously. Such illumination techniques may be referred to herein as "fixed spot illumination." In some examples, the lidar system 100 may illuminate a line within the FOV and use a scanner (e.g., a 1D scanner) to scan the line over the entire FOV. Such illumination techniques may be referred to herein as "scanned line illumination." In some examples, the lidar system 100 may simultaneously illuminate one or more spots within the FOV and use a scanner (e.g., a 1D or 2D scanner) to scan the spots over the entire FOV. Such illumination techniques may be referred to herein as "scanned spot illumination."

Any suitable optical detector may be used including, without limitation, one or more photodetectors, contact image sensors (CIS), solid-state photodetectors (e.g., photodiodes (PD), single-photon avalanche diode (SPADs), avalanche photodiodes (APDs), etc.), photomultipliers (e.g., silicon photomultipliers (SiPMs), and/or any other device operable to convert light (e.g., optical signals) into electrical signals. In some examples, CIS can be fabricated using a complementary metal-oxide semiconductor (CMOS) process. In some examples, solid-state photodetectors can be fabricated using semiconductor processes similar to CMOS. Such semiconductor processes may use silicon, germanium, indium gallium arsenide, lead (II) sulfide, mercury cadmium, telluride, $MoS_2$, graphene, and/or any other suitable material(s). In some examples, an array of integrated or discrete CIS or solid-state photodetectors can be used to simultaneously image (e.g., perform optical detection across) the lidar device's entire field of view or a portion thereof. In general, solid-state photodetectors may be configured to detect light having wavelengths between 190 nm (or lower) and 1.4 μm (or higher). PDs and APDs configured to detect light having wavelengths of approximately 905 nm, 1300 nm, or 1550 nm are widely commercially available.

The lidar system 100 may include any suitable combination of measurement technique(s), light source(s), illumination technique(s), and detector(s). Some combinations may be more accurate or more economical on certain conditions. For example, some combinations may be more economical for short-range sensing but incapable of provide accurate measurements at longer ranges. Some combinations may pose potential hazards to eye safety, while other combinations may reduce such hazards to negligible levels.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 or the receiver 106 determines (e.g., measures) particular characteristics of the return light signal 114 detected by the receiver 106. For example, the control & data acquisition module 108 or receiver 106 may measure the intensity of the return light signal 114 using any suitable technique.

Operational parameters of the transceiver 102 may include its horizontal field of view ("FOV") and its vertical FOV. The FOV parameters effectively define the region of the environment that is visible to the specific lidar transceiver 102. More generally, the horizontal and vertical FOVs of a lidar system 100 may be defined by combining the fields of view of a plurality of lidar devices 102.

To obtain measurements of points in its environment and generate a point cloud based on those measurements, a lidar system 100 may scan its FOV. A lidar transceiver system 100 may include one or more beam-steering components (not shown) to redirect and shape the emitted light signals 110 and/or the return light signals 114. Any suitable beam-steering components may be used including, without limitation, mechanical beam steering components (e.g., rotating assemblies that physically rotate the transceiver(s) 102, rotating scan mirrors that deflect emitted light signals 110 and/or return light signals 114, etc.), optical beam steering components (e.g., lenses, lens arrays, microlenses, microlens arrays, beam splitters, etc.), microelectromechanical (MEMS) beam steering components (e.g., MEMS scan mirrors, etc.), solid-state beam steering components (e.g., optical phased arrays, optical frequency diversity arrays, etc.), etc.

In some implementations, the lidar system 100 may include or be communicatively coupled to a data analysis & interpretation module 109, which may receive outputs (e.g., via a connection 116) from the control & data acquisition module 108 and may perform data analysis on those outputs. By way of example and not limitation, connection 116 may be implemented using wired or wireless (e.g., non-contact communication) technique(s).

Figure 2A:
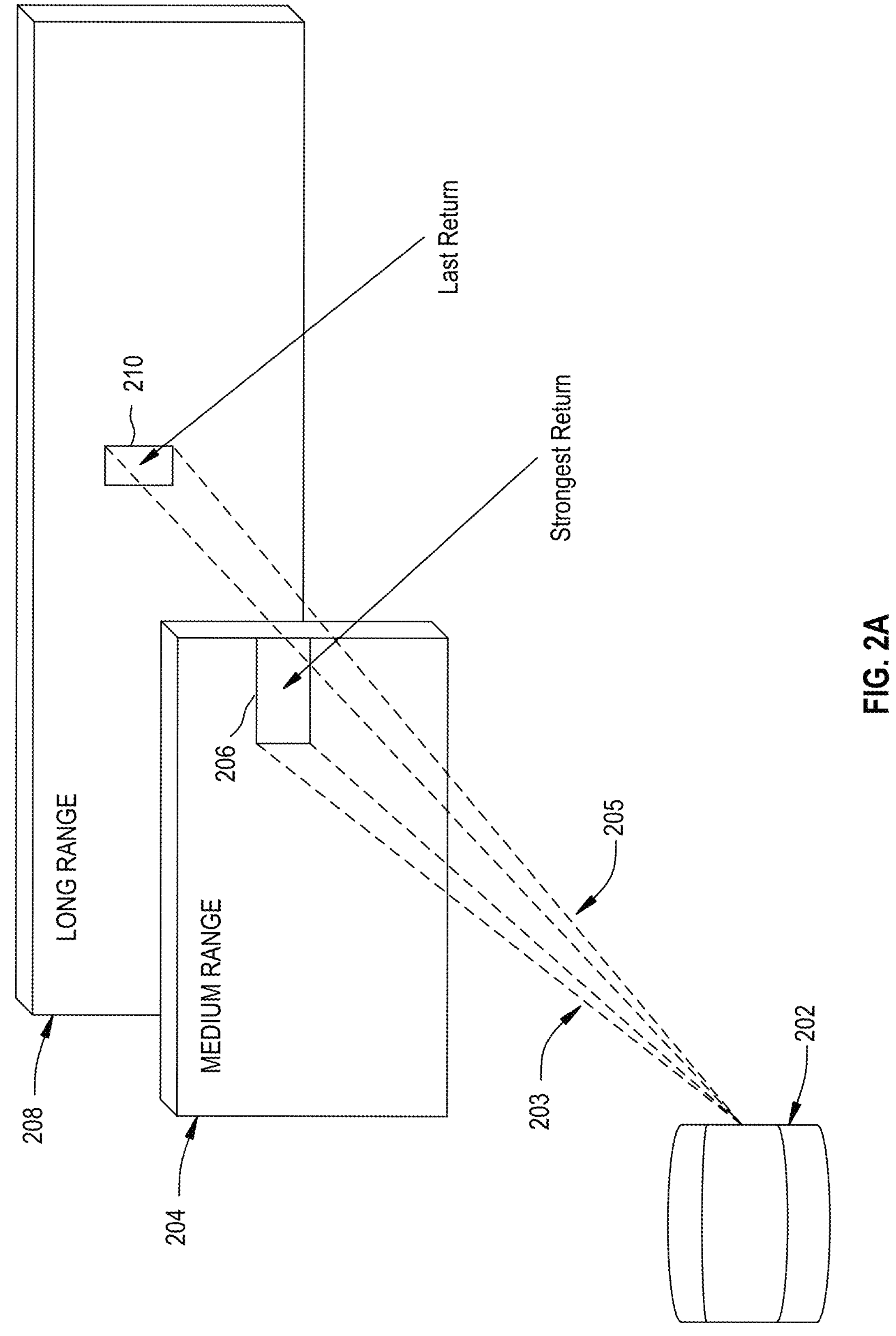
FIG. 2A is an illustration of the operation of a lidar system, in accordance with some embodiments.

FIG. 2A illustrates the operation of a lidar system 202, in accordance with some embodiments. In the example of FIG. 2A, two return light signals 203 and 205 are shown. Because laser beams generally tend to diverge as they travel through a medium, a single laser emission may hit multiple objects at different ranges from the lidar system 202, producing multiple return signals 203, 205. The lidar system 202 may analyze multiple return signals 203, 205 and report one of the return signals (e.g., the strongest return signal, the last return signal, etc.) or more than one (e.g., all) of the return signals. In the example of FIG. 2A, lidar system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared to return signal 205. In both single- and multiple-return lidar systems, it is important that each return signal is accurately associated with the transmitted light signal so that one or more attributes of the object reflecting the light signal (e.g., range, velocity, reflectance, etc.) can be correctly estimated.

Some embodiments of a lidar system may capture distance data in a two-dimensional ("2D") (e.g., within a single plane) point cloud manner. These lidar systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the lidar system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each corresponding to a different elevation (e.g., a different position and/or direction with respect to a vertical axis). Operational parameters of the receiver of a lidar system may include the horizontal FOV and the vertical FOV.

Figure 2B:
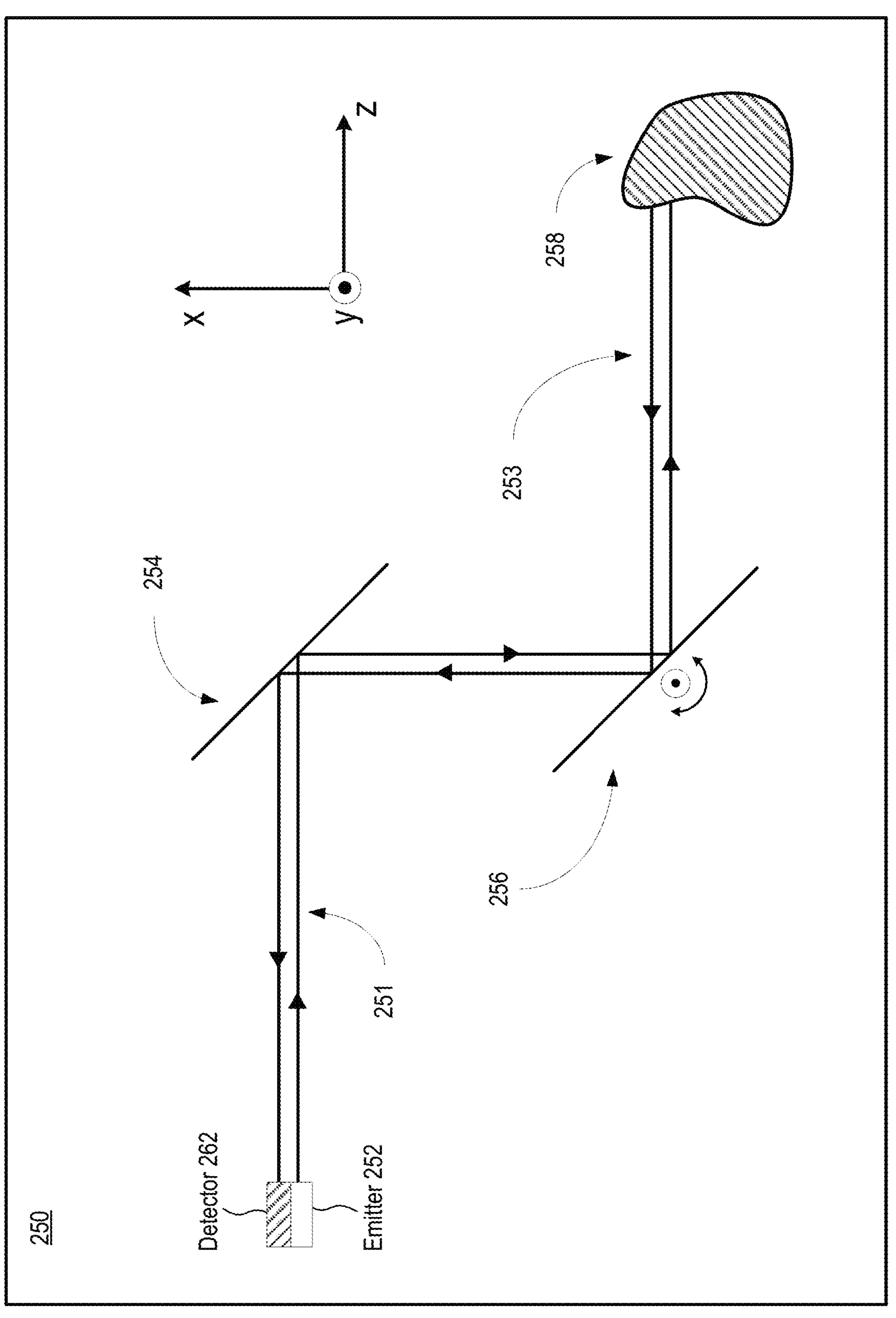
FIG. 2B is an illustration of optical components of a channel of a lidar system with a movable mirror, in accordance with some embodiments.

FIG. 2B depicts a lidar system 250 with a movable (e.g., rotating or oscillating) mirror, according to some embodiments. In the example of FIG. 2B, lidar system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to fixed mirror 254, which may reflect emitted laser signal 251 to movable mirror 256. As movable mirror 256 moves (e.g., oscillates), emitted laser signal 251 may reflect off an object 258 in its propagation path. The reflected return signal 253 may be coupled to detector 262 via movable mirror 256 and fixed mirror 254. In some embodiments, the movable mirror 256 is implemented with mechanical technology or with solid state technology (e.g., MEMS).

Figure 2C:
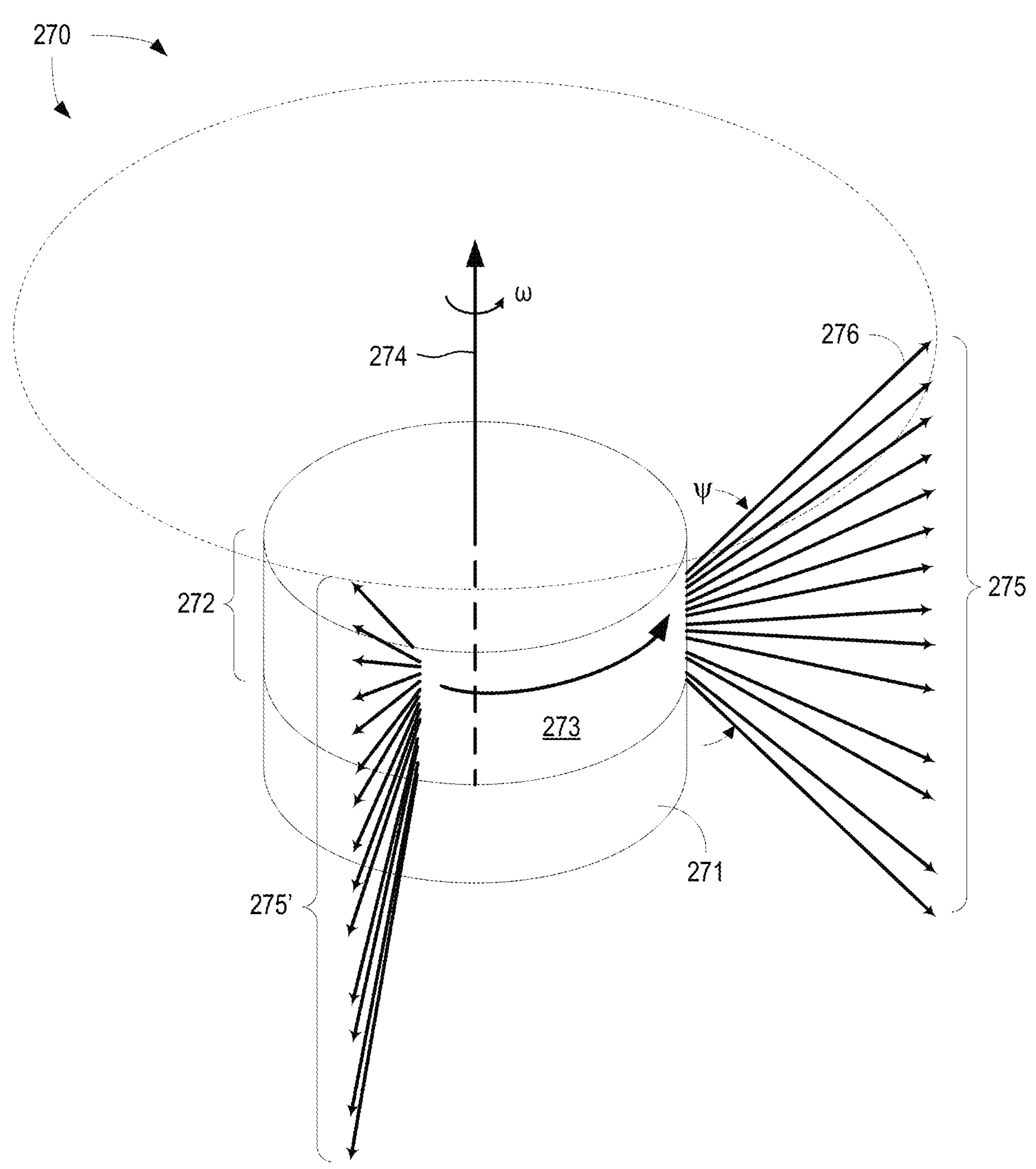
FIG. 2C is an illustration of an example of a 3D lidar system, in accordance with some embodiments.

FIG. 2C depicts a 3D lidar system 270, according to some embodiments. In the example of FIG. 2C, 3D lidar system 270 includes a lower housing 271 and an upper housing 272. Upper housing 272 includes a cylindrical shell element 273 constructed from a material that is transparent to infrared light (e.g., light having a wavelength within the spectral range of 700 to 1,700 nanometers). In one example, cylindrical shell element 273 is transparent to light having wavelengths centered at 905 nanometers.

In some embodiments, the 3D lidar system 270 includes a lidar transceiver, such as transceiver 102 shown in FIG. 1, operable to emit laser beams 276 through the cylindrical shell element 273 of the upper housing 272. In the example of FIG. 2C, each individual arrow in the sets of arrows 275, 275' directed outward from the 3D lidar system 270 represents a laser beam 276 emitted by the 3D lidar system. Each beam of light emitted from the system 270 (e.g., each laser beam 276) may diverge slightly, such that each beam of emitted light forms a cone of light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D lidar system 270. The direction of each emitted beam may be determined by the angular orientation ω of the transceiver's transmitter 104 with respect to the system's central axis 274 and by the angular orientation ψ of the transmitter's movable mirror (e.g., similar or identical to movable mirror 256 shown in FIG. 2B) with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation ψ of the transmitter's movable mirror. Alternatively, the direction of an emitted beam in a vertical dimension may be determined the transmitter's angular orientation ω, and the direction of the emitted beam in a horizontal dimension may be determined by the angular orientation ψ of the transmitter's movable mirror. (For purposes of illustration, the beams of light 275 are illustrated in one angular orientation relative to a non-rotating coordinate frame of the 3D lidar system 270 and the beams of light 275' are illustrated in another angular orientation relative to the non-rotating coordinate frame.)

The 3D lidar system 270 may scan a particular point (e.g., pixel) in its field of view by adjusting the angular orientation ω of the transmitter and the angular orientation ψ of the transmitter's movable mirror to the desired scan point (ω, ψ) and emitting a laser beam from the transmitter 104. Accordingly, the 3D lidar system 270 may systematically scan its field of view by adjusting the angular orientation ω of the transmitter and the angular orientation ψ of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a lidar transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" or "listening period" of the scan point associated with the transmitted beam 110 and the return beam 114.

In many lidar systems, the optical component(s) of a lidar transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location L0 of the spot that would have been formed absent the intervening rotation of the optical component(s) during the ranging period is referred to herein as "walk-off."

Figure 2D:
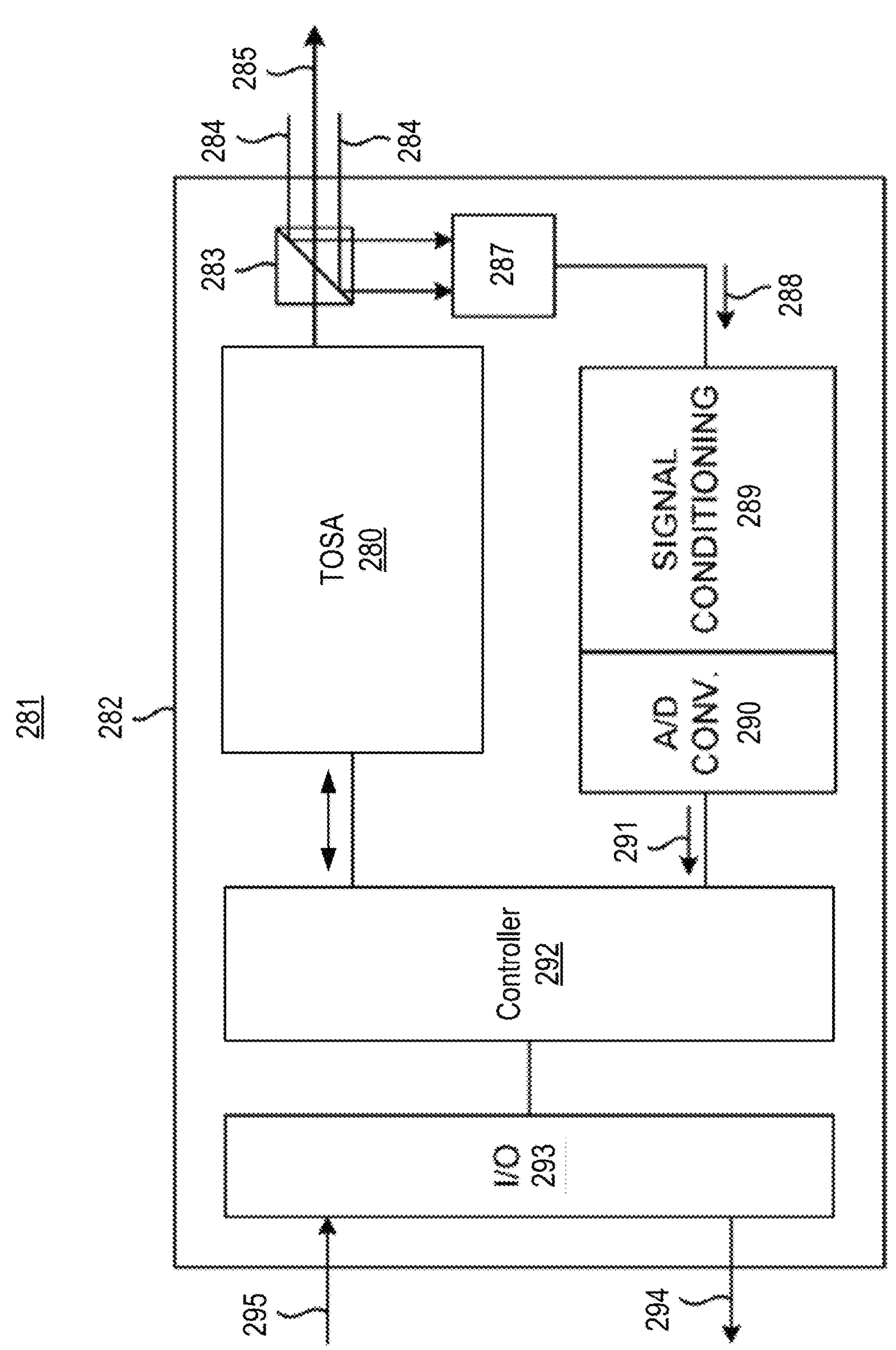
FIG. 2D is a block diagram of a transmitter-receiver optical sub-assembly (TROSA), according to some embodiments.

Referring to FIG. 2D, a block diagram of a transmitter-receiver optical subassembly (TROSA) 281 is shown, according to some embodiments. In some embodiments, the TROSA 281 may include a TOSA 280, an optical detector 287, a beam splitter 283, signal conditioning electronics 289, an analog to digital (A/D) converter 290, controller 292, and digital input/output (I/O) electronics 293. In some embodiments, the TROSA components illustrated in FIG. 2D are integrated onto a common substrate 282 (e.g., printed circuit board, ceramic substrate, etc.). In some embodiments, the TROSA components illustrated in FIG. 2D are individually mounted to a common substrate 282. In some embodiments, groups of these components are packaged together and the integrated package(s) is/are mounted to the common substrate.

The TOSA 280 may include one or more light sources and may operate the light source(s) safely within specified safety thresholds. A light source of the TOSA may emit an optical signal (e.g., laser beam) 285.

A return signal 284 may be detected by the TROSA 281 in response to the optical signal 285 illuminating a particular location. For example, the optical detector 287 may detect the return signal 284 and generate an electrical signal 288 based on the return signal 284. The controller 292 may initiate a measurement window (e.g., a period of time during which collected return signal data are associated with a particular emitted light signal 285) by enabling data acquisition by optical detector 287. Controller 292 may control the timing of the measurement window to correspond with the period of time when a return signal is expected in response to the emission of an optical signal 285. In some examples, the measurement window is enabled at the time when the optical signal 285 is emitted and is disabled after a time period corresponding to the time of flight of light over a distance that is substantially twice the range of the lidar device in which the TROSA 281 operates. In this manner, the measurement window is open to collect return light from objects adjacent to the lidar device (e.g., negligible time of flight), objects that are located at the maximum range of the lidar device, and objects in between. In this manner, other light that does not contribute to a useful return signal may be rejected.

In some embodiments, the signal analysis of the electrical signal 288 produced by the optical detector 287 is performed by the controller 292, entirely. In such embodiments, the signals 294 provided by the TROSA 281 may include an indication of the distances determined by controller 292. In some embodiments, the signals 294 include the digital signals 291 generated by the A/D converter 290. These raw measurement signals 291 may be processed further by one or more processors located on board the lidar device or external to the lidar device to arrive at a measurement of distance. In some embodiments, the controller 292 performs preliminary signal processing steps on the signals 291 and the signals 294 include processed data that are further processed by one or more processors located on board the lidar device or external to the lidar device to arrive at a measurement of distance.

In some embodiments a lidar device (e.g., a lidar device 100, 202, 250, or 270) includes multiple TROSAs 281. In some embodiments, a delay time is enforced between the firing of each TROSA and/or between the firing of different light sources within the same TROSA. In some examples, the delay time is greater than the time of flight of the light signal 285 to and from an object located at the maximum range of the lidar device, to reduce or avoid optical cross-talk among any of the TROSAs 281. In some other examples, an optical signal 285 is emitted from one TROSA 281 before a return signal corresponding to a light signal emitted from another TROSA 281 has had time to return to the lidar device. In these embodiments, there may be sufficient spatial separation between the areas of the surrounding environment interrogated by the light signals of these TROSAs to avoid optical cross-talk.

In some embodiments, digital I/O 293, A/D converter 290, and signal conditioning electronics 289 are integrated onto a single, silicon-based microelectronic chip. In another embodiment, these same elements are integrated into a single gallium-nitride or silicon based circuit that also includes components of the TOSA 280 (e.g., an illumination driver). In some embodiments, the A/D converter 290 and controller 292 are combined as a time-to-digital converter.

As depicted in FIG. 2D, return light 284 reflected from the surrounding environment is detected by optical detector 287. In some embodiments, optical detector 287 includes one or more avalanche photodiodes (APDs) and/or single-photon avalanche diodes (SPADs). Any suitable optical detector may be used. In some embodiments, optical detector 287 generates an output signal 288 that is amplified by signal conditioning electronics 289. In some embodiments, signal conditioning electronics 289 include an analog trans-impedance amplifier. However, in general, the amplification of output signal 288 may include multiple amplifier stages. In this sense, an analog transimpedance amplifier is provided by way of non-limiting example, as many other analog signal amplification schemes may be used.

In some embodiments, the amplified signal is communicated to A/D converter 290, and the digital signals generated by the A/D converter are communicated to controller 292. Controller 292 may generate an enable/disable signal to control the timing of data acquisition by ADC 290.

As depicted in FIG. 2D, the optical signal 285 emitted from the TROSA 281 and the return signal 284 directed toward the TROSA 281 share a common path within the lidar device. In the embodiment depicted in FIG. 2D, the return light 284 is separated from the emitted light 285 by a beam splitter 283. The beam splitter may direct the light 285 emitted by the TOSA 280 toward the lidar device's environment, and direct the return light 284 to the optical detector 287. Any suitable beam splitter may be used, including (without limitation) a polarizing beam splitter, nonpolarizing beam splitter, dielectric film, etc.). Some non-limiting examples of suitable beam splitters are described in International Patent Publication No. WO 2017/164989.

Hybrid Lidar System

Figure 3:
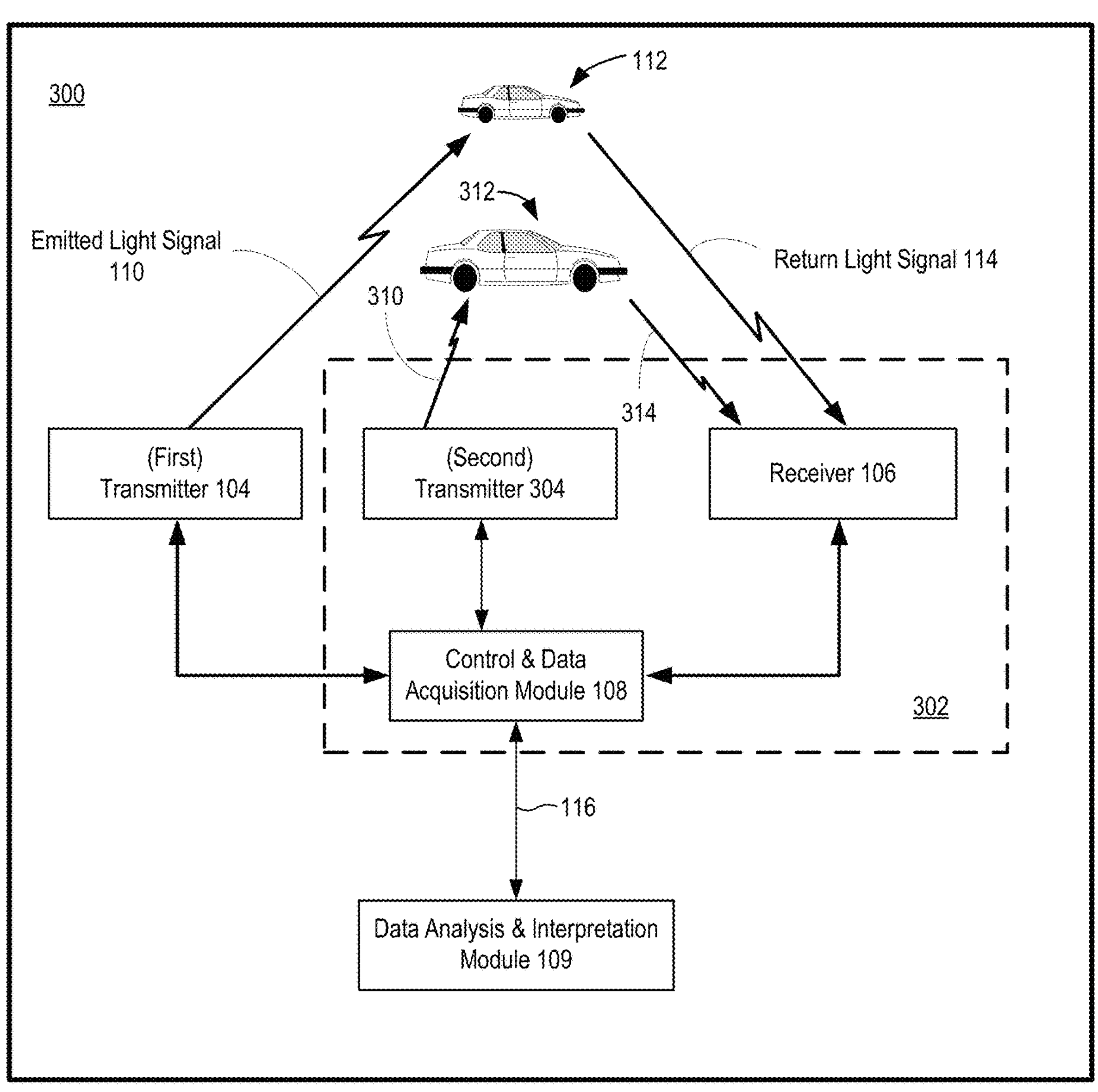
FIG. 3 is a schematic block diagram of an illustrative lidar system structured and arranged to provide long-, medium-, and short-range detection, in accordance with some embodiments.

Referring to FIG. 3, a block diagram of an illustrative (e.g., hybrid) lidar system 300 that is structured and arranged to provide long-, medium-, and short-range detection in accordance with some embodiments is shown. Although the hybrid lidar system 300 will be described as part of a system that is capable of detecting and processing short-range return signals as well as medium- and long-range return signals, those skilled in the art can appreciate that a stand-alone system may be designed to detect and process only short-range return signals. In some implementations, the short-range components are capable of detecting objects in the range of about 10 to about 20 meters from the lidar system 300; although application of a diffuser to the short-range illumination signals may limit the detection range to about 1 or 2 meters (or less).

In some variations, hybrid lidar system 300 is a solid-state system that is structured and arranged to include a transmitter 104 (e.g., "first," "primary," or "far-field" transmitter), a transmitter 304 (e.g., "second," "secondary," "supplemental," "flash," or "near-field" transmitter), a receiver 106, a control & data acquisition module 108, and a data analysis & interpretation module 109. Collectively, transmitter 104, receiver 106, and control & data acquisition module 108 of lidar system 300 may be configured to operate as a far-field (e.g., primary) lidar device (e.g., channel), capable of providing data from medium- and long-range scan areas as previously described. In some implementations, transmitter 104 is configured to emit laser (e.g., illumination) light signals 110 towards a medium- and long-range scan area and to receive return light signals 114 therefrom. In some embodiments, the light source of the transmitter 104 may be a light-emitting diode (LED), an edge-emitting diode laser, a line laser having an edge emitter and a (e.g., fiber) filter, or any other light source suitable for transmitting illumination signals to the far field. In some embodiments, after being shaped by the optical components of the transmitter 104, the emitted light signal 110 may be tightly focused (e.g., with a divergence of less than 15 degrees, less than 10 degrees, less than 5 degrees, less than 2 degrees, or less than 1 degree), and may have a range of tens to hundreds of meters.

Collectively, near-field transmitter 304, receiver 106, and control & data acquisition module 108 of lidar system 300 may be configured to operate as a near-field (e.g., secondary) lidar device (e.g., channel) 302, capable of providing data from short-range scan areas. In some applications, near-field transmitter 304 is structured and arranged to generate and emit a (e.g., supplemental) laser (e.g., illumination) signal 310 that is capable of illuminating objects 312 in a short-range scan area located within the near-field, such that (e.g., short-range) return signals 314 may be received and detected by the receiver 106.

In some applications, the near-field transmitter 304 may be adapted to emit a short-range light (e.g., illumination) signal 310 to illuminate objects 312 in the near-field. The short-range light signal 310 (sometimes referred to herein as a "flash beam") may be significantly more diffuse and more divergent than light signal 110 (e.g., the long-range light signal), such that the short-range signal's energy density decreases rapidly with distance and effective range is low (e.g., a few meters). In some embodiments, near-field transmitter 304 includes one or more laser emitters each capable of emitting a (e.g., short-range) light signal 310 (e.g., laser beam). In some variations, each of the emitters of the transmitter 304 may be a vertical-cavity surface-emitting laser ("VCSEL"), a line laser having an edge emitter and a (e.g., fiber) filter, etc. In some embodiments, the short-range transmitter 304 may also include one or more diffusers adapted to shape light signals 310 (e.g., beams) generated by the short-range transmitter 304 such that they fill the horizontal and vertical FOV of lidar device 302.

In some embodiments, lidar system 300 includes one transmitter 304. In some embodiments, lidar system 300 includes one transmitter 304 per array of transmitters 104 (or array of first emitters) configured to scan different vertical regions of the system's FOV (e.g., array of 4, 8, 16, 32, or 64 transmitters or emitters). In some embodiments, lidar system 300 includes one transmitter 304 per transmitter 104 (or emitter).

In some embodiments, lidar system 300 activates a single receiver 106 to receive return signals in the short-range listening period after transmitter 304 emits a light (e.g., laser) signal 310. In such embodiments, lidar system 300 may be able to detect the presence of an object within the near-field, but may not be able to determine the precise location of the object (e.g., the vertical and horizontal coordinates of the object) within the FOV. In some embodiments, lidar system 300 activates two or more receivers 106 (e.g., an array of 4, 8, 16, 32, or 64 receivers) to receive return signals in the short-range listening period after transmitter 304 emits a laser signal 310. In such embodiments, lidar system 300 may be able to detect the presence of an object within the near-field, and be able to determine at least the vertical coordinate(s) of the object within the FOV. In some embodiments, lidar system 300 may activate transmitter 304 once each time lidar system 300 finishes scanning the entire FOV (e.g., via at least one transmitter 104), once each time a first transmitter 104 (or first emitter) finishes scanning a scan line (e.g., horizontal scan line) within the FOV, or once each time a first transmitter 104 (or first emitter) scans a pixel within the FOV. Any of the foregoing configurations may be suitable for various applications of lidar system 300 (e.g., autonomous vehicle navigation).

Advantageously, the timing of the firing of transmitter 304 of the near-field lidar device 302 with respect to the firing of transmitter 104 of the far-field lidar device may be selected, inter alia, to avoid dazzle interference. More particularly, the near-field transmitter 304 may be adapted to generate and emit a flash (e.g., illumination) signal 310 a predetermined amount of time before or after the generation and emission of light (e.g., illumination) signals 110 by the transmitter 104.

Preferably, flash signal 310 is emitted separately and distinctly from the (e.g., laser) light (e.g., illumination) signals 110 emitted by transmitter 104 of lidar system 300. Such emission may occur, for example, at the end of or at the beginning of every laser position (LPOS). Those of ordinary skill in the art can appreciate that receiver 106 and control & data acquisition module 108 can be integrated into the far-field lidar device, and/or that data analysis & interpretation module 109 may be used to control the firing of flash signals 310 by the (e.g., supplemental) transmitter 304 of the (e.g., secondary) flash lidar device 302 and to receive and process the return flash signals 314. Optionally, in some embodiments, the (e.g., secondary) flash lidar device 302 may be structured and arranged to include a separate receiver (not shown) (e.g., separate from the receiver 106), control & data acquisition module (not shown) (e.g., separate from the control & data acquisition module 108), and/or data analysis & interpretation module (not shown).

Cancellation of Dazzle Signal in Lidar Sensors

In some embodiments, the disclosed system and method may be used in lidar devices to mitigate or eliminate the adverse effects of a dazzle (e.g., during near-field detection). As described herein, for a channel of the lidar device, a transmitter may emit an optical signal based on a configured operating mode, where the power (Lp) (e.g., a temperature-calibrated power) supplied to the transmitter at the configured operating mode determines the resulting power level (Sp) of the emitted optical signal. The receiver may receive a return signal corresponding to the optical signal and generate an output indicative of light intensities received by the receiver during a time period (e.g., a voltage time history). In some cases, the receiver may receive a dazzle signal reflected from the device's enclosure—e.g., a reflection originating from one or more internal components of the lidar device. The dazzle signal may blind the receiver and/or may prevent the receiver from detecting valid return signals from objects located in the near field. Advantageously, by using the systems and methods described herein, a lidar device may remove the effect of the dazzle signal, such that the blinding period for the receiver can be reduced or eliminated. In various examples, the term "valid return signal" as used herein can refer to an optical signal reflected from one or more objects in an environment surrounding the lidar device (e.g., within the near field). For example, the lidar device can emit an optical signal into the surrounding environment, an object in the surrounding environment can reflect the optical signal, and the lidar device can receive the reflection as a valid return signal.

In some embodiments, removal of the dazzle signal effect is accomplished by coupling and positioning a pair of photodetectors (e.g., photodiodes or other optical sensors) in one or more channels of the receiver. The first photodetector in the pair is able to receive a dazzle signal and an optical signal reflected from a surrounding environment (e.g., a valid return signal), to produce a first current $I_1$. The second photodetector in the pair is able to receive the dazzle signal but is unable to receive the valid return signal, and produces a second current $I_2$. The second current $I_2$ (attributed to the dazzle signal) is subtracted from the first current $I_1$ (attributed to a combination of the dazzle signal and the valid return signal) to eliminate the contribution or effect of the dazzle signal. The resulting current, $I_1-I_2$, is attributed to the valid return signal (not the dazzle signal) and is fed to a TIA.

Figure 4A:
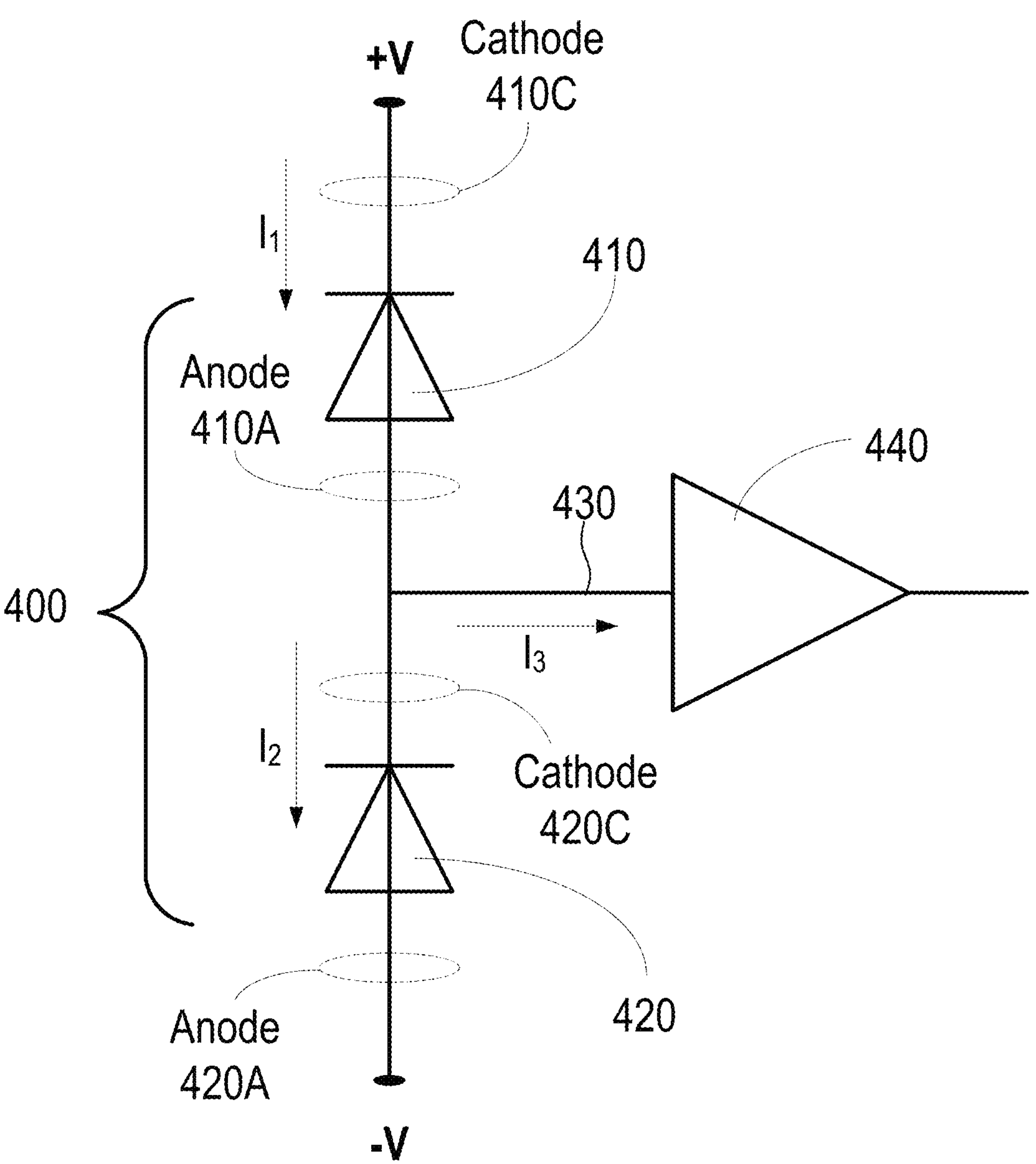
FIG. 4A is a schematic representation of a photodetector pair used to remove or suppress a dazzle effect in a lidar device, in accordance with some embodiments.

FIG. 4A is a schematic representation of a photodetector pair 400 (e.g., a pair of photodiodes) that can be used to remove or suppress the dazzle effect in a lidar device, according to some embodiments. By way of example and not limitation, photodetector pair 400 may be a component of a receiver (e.g., receiver 106 in lidar systems 100 and 300) or a component of a detector (e.g., detector 262 in lidar system 250). In some embodiments, photodetector pair 400 includes a first photodetector 410 and a second photodetector 420. By way of example and not limitation, each of the first and second photodetectors 410 and 420 can be an APD or PIN photodiode.

Regardless of the photodetector type, photodetectors 410 and 420 in photodetector pair 400 can be electrically connected so that they are reverse biased, as shown in FIG. 4A. That is, cathode 410C of first photodetector 410 can be connected to a positive voltage (+V) and anode 420A of second photodetector 420 can be connected to a negative voltage (−V). Additionally, anode 410 A of first photodetector 410 and cathode 420C of second photodetector 420 can be coupled to an input of an amplifier or TIA 440 via an electrical connection 430. According to some embodiments, TIA 440 (or other type of amplifier) can convert photocurrent generated by photodetector pair 400 (e.g., when any of the photodetectors in the pair is illuminated by an incident optical signal) to a corresponding voltage. When an optical signal illuminates photodetector pair 400, first photodetector 410 and second photodetector 420 can produce respective photocurrents $I_1$ and $I_2$ under the aforementioned biasing conditions. When photodetector pair 400 is not illuminated by an optical signal, photocurrents $I_1$ and $I_2$ can be negligeable and dominated by dark current. According to Kirchhoff's current law, current $I_3$ flowing towards TIA 440 along electrical connection 430 is equal to $I_1-I_2$ (e.g., $I_3=I_1-I_2$).

Figure 5:
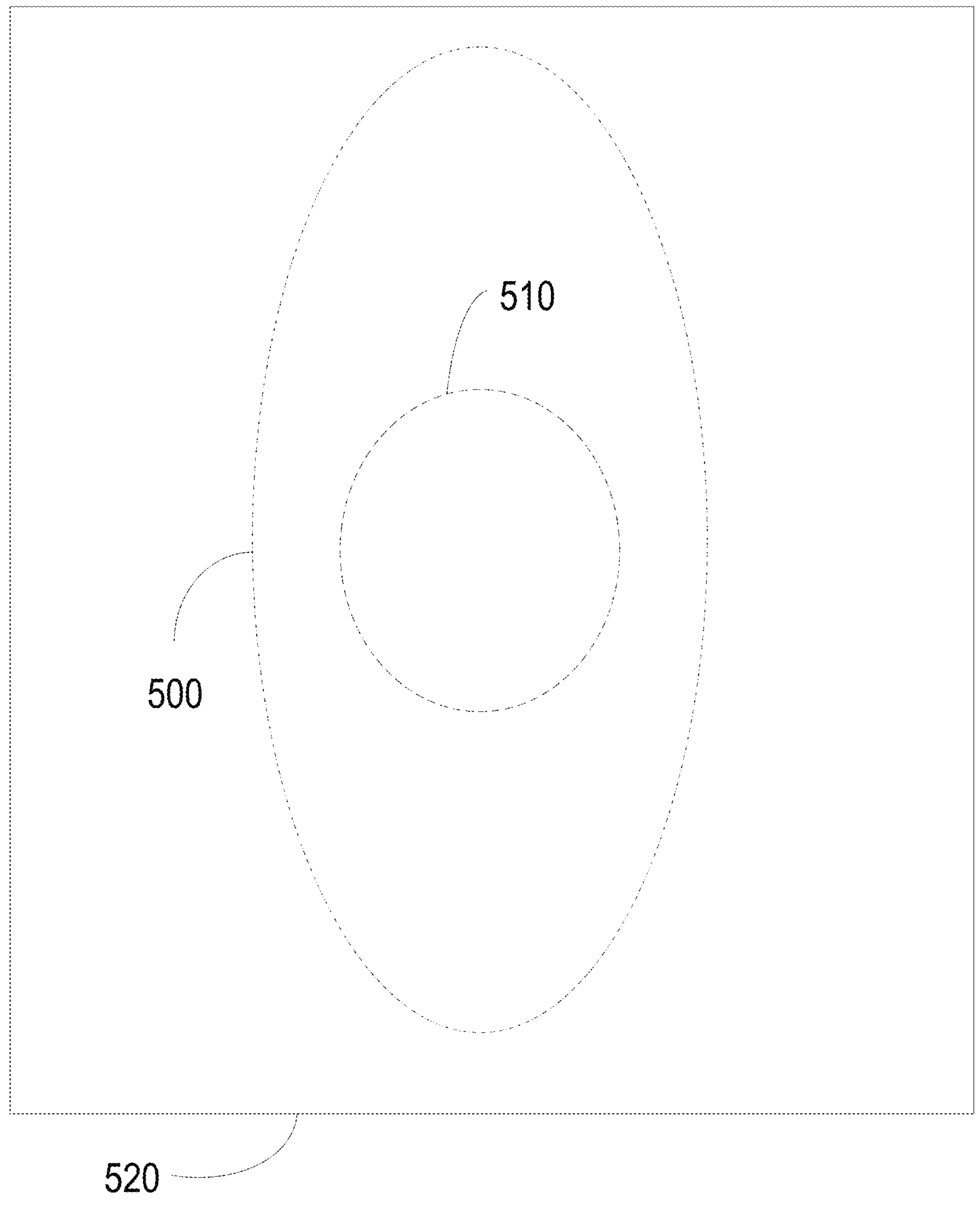
FIG. 5 is a schematic representation of a dazzle signal footprint and a valid return signal footprint on a two-dimensional surface, in accordance with some embodiments.

In various examples, the projection of the dazzle signal on the detector (e.g., the dazzle signal's footprint) can be larger than that of a valid return signal reflection because the dazzle signal can be caused by scattering from optical apertures or edges and back-reflection from various surfaces. Hence, the dazzle signal may not follow the same return path that is followed by the valid return signal reflection. Also, because the incident illumination from dazzle is more diffuse (e.g., less focused) compared to the incident illumination from a valid return signal reflection, the dazzle signal can have a wider footprint than that of a valid return signal, such that the dazzle signal may illuminate both photodetectors 410 and 420 but the valid return signal may illuminate only one of photodetectors 410 and 420. This is shown schematically in FIG. 5 where a dazzle signal 500 is superimposed with a valid return signal 510 on a 2D surface 520. By way of example and not limitation, surface 520 may be a circuitry board on which photodetectors (e.g., photodetectors 410 and 420) can be placed for the purpose of detecting incident optical signals in a lidar device. In some examples, the valid return signal 510 can have a footprint that is smaller (e.g., about 80 times smaller) and/or less intense than that of dazzle signal 500 for a low reflectivity target (e.g., having about 1% reflectivity).

Referring again to FIG. 4A, it is therefore possible to arrange first and second photodetectors 410 and 420 in photodetector pair 400 so that the following illumination condition can occur: (i) both photodetectors 410 and 420 are illuminated by a dazzle signal; and (ii) only one of photodetectors 410 and 420 is illuminated by a valid return signal. For example, first and second photodetectors 410 and 420 can be positioned on a plane (e.g., on a circuit board) based on the footprint or focal point position of each signal type (e.g., of a dazzle signal and of a valid return signal) so that the aforementioned illumination condition can be satisfied. A variety of separation and/or spatial arrangements of first and second photodetectors 410 and 420 in photodetector pair 400 can be used to achieve the aforementioned illumination condition. It is understood that the schematic diagram in FIG. 4A is not necessarily true to scale and may not provide an accurate representation of how photodetectors 410 and 420 are sized or arranged relative to one another or with respect to TIA 440.

Figure 4B:
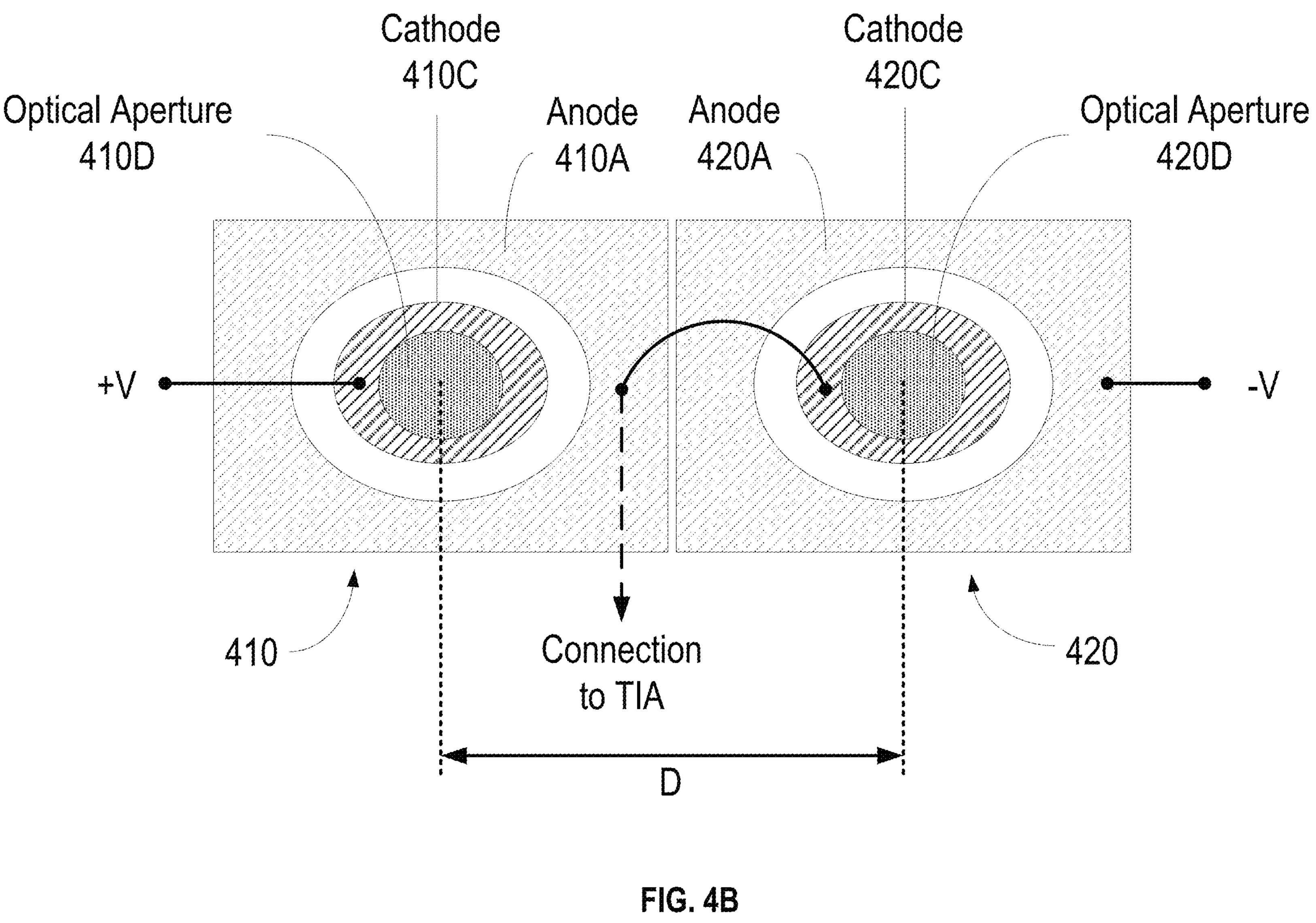
FIG. 4B is a schematic top view of a photodetector pair, in accordance with some embodiments.

FIG. 4B is a schematic top view of an exemplary spatial arrangement of physical components for first and second photodetectors 410 and 420, according to some embodiments. In the depicted example, the first and second photodetectors 410 and 420 include respective optical apertures 410D and 420D, which are positioned to both be illuminated by a dazzle signal, while only one of the optical apertures (e.g., 410D or 420D) from photodetectors 410 and 420 can be illuminated by a valid return signal. In some examples, a center-to-center separation distance D between the two optical apertures can be less than or equal to, for example, about 0.5 mm, about 1 mm, or about 2 mm. In some embodiments, the center-to-center separation distance D is in the micron scale. For example, the center-to-center separation distance D can be about 700 μm. In some embodiments, the center-to-center separation distance D can depend on the system design and/or the aperture (e.g., size) of the photodetectors used. For example, smaller aperture photodetectors may have smaller footprints and may be placed closer together.

Figure 4C:
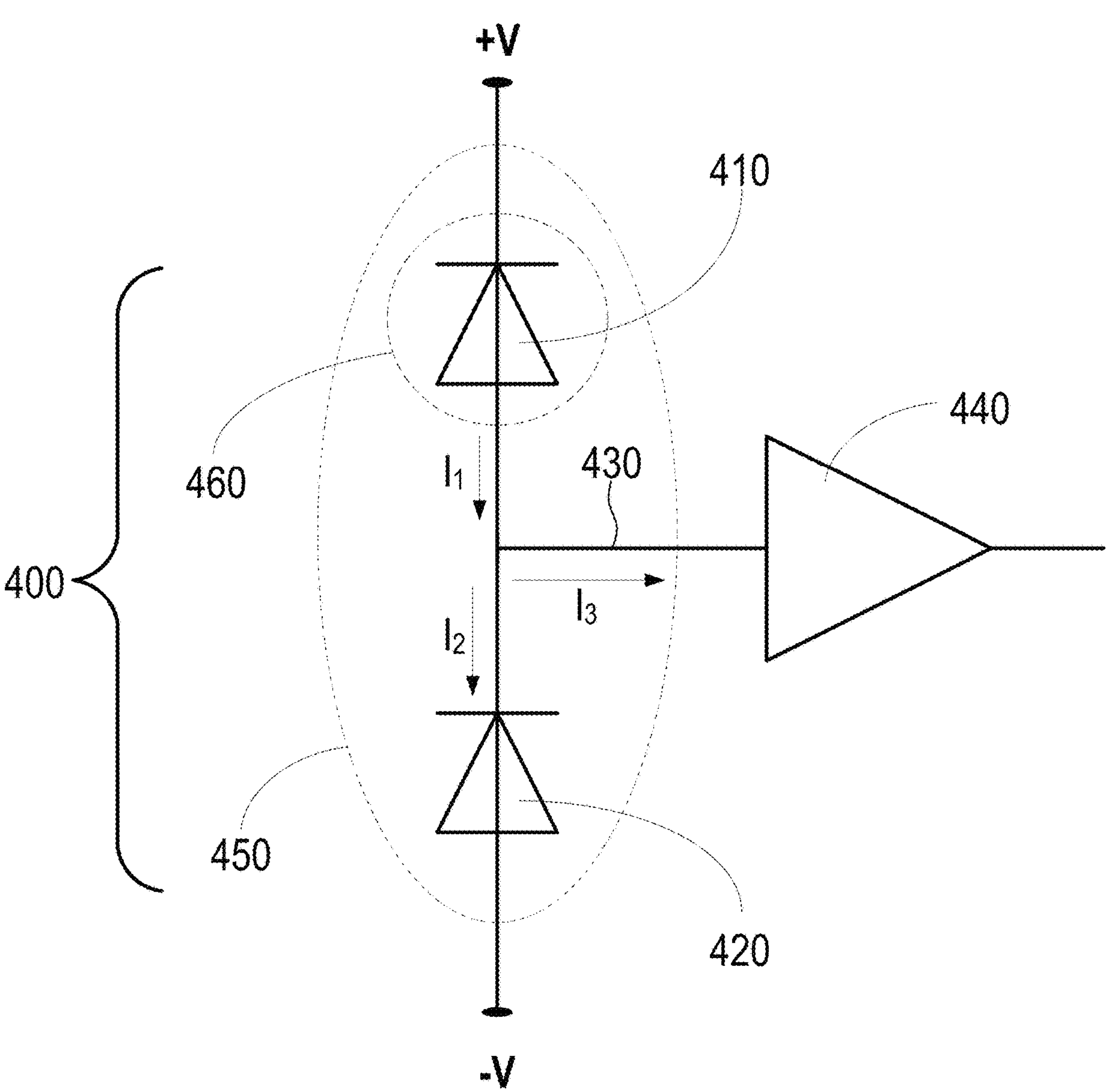
FIGS. 4C-4E are schematic representations of a photodetector pair under various illumination conditions, in accordance with some embodiments.

This illumination condition is schematically shown in FIG. 4C, where both first and second photodetectors 410 and 420 are illuminated by a dazzle signal 450 (e.g., dazzle signal 500), and only first photodetector 410 is illuminated by a valid return signal 460 (e.g., valid return signal 510). Accordingly, dazzle signal 450 and valid return signal 460 may both contribute to photocurrent $I_1$ generated in first photodetector 410, while dazzle signal 450 (but not valid return signal 460) may contribute to photocurrent $I_2$ generated in second photodetector 420.

Figure 4D:
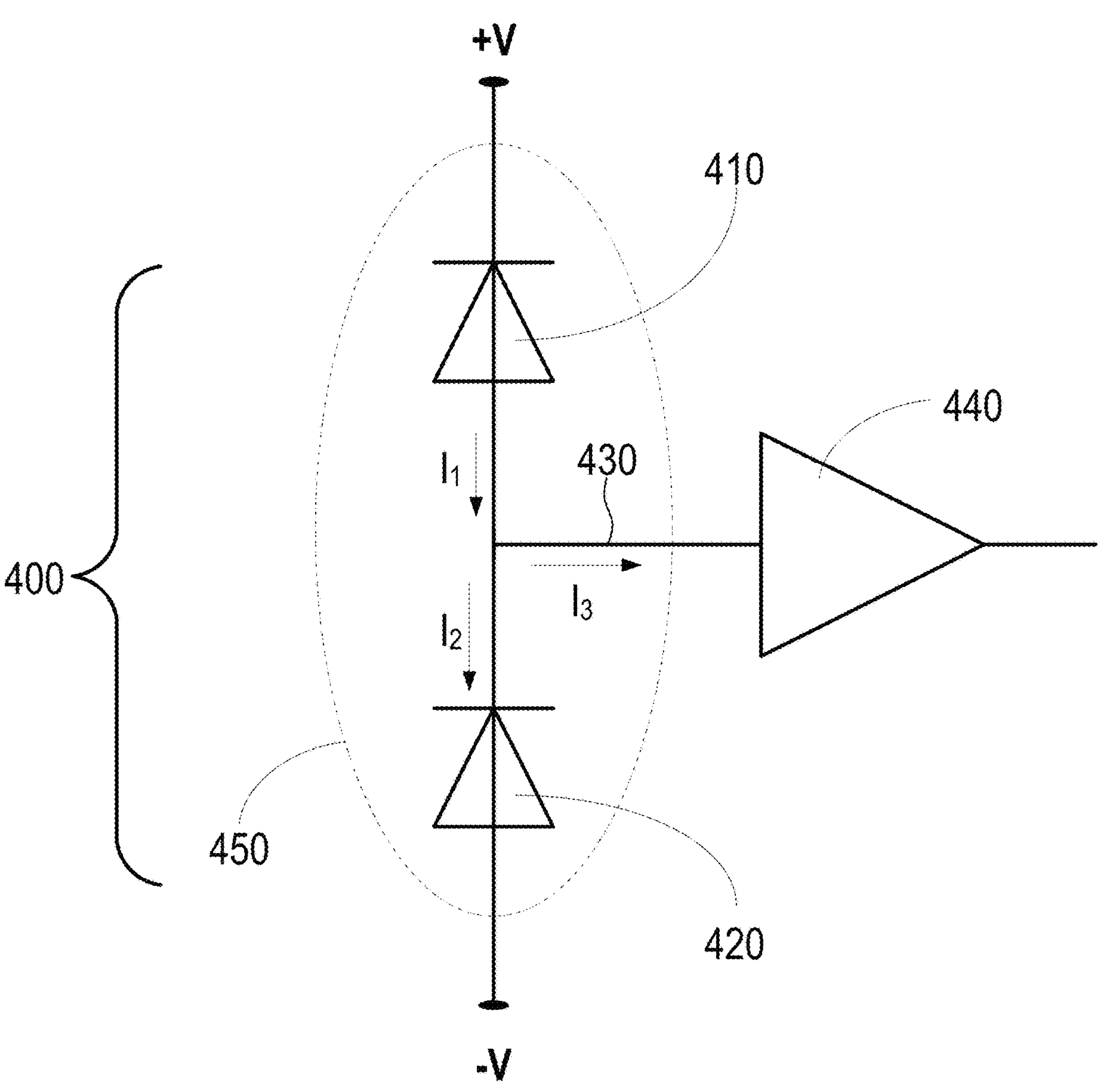
Figure 4E:
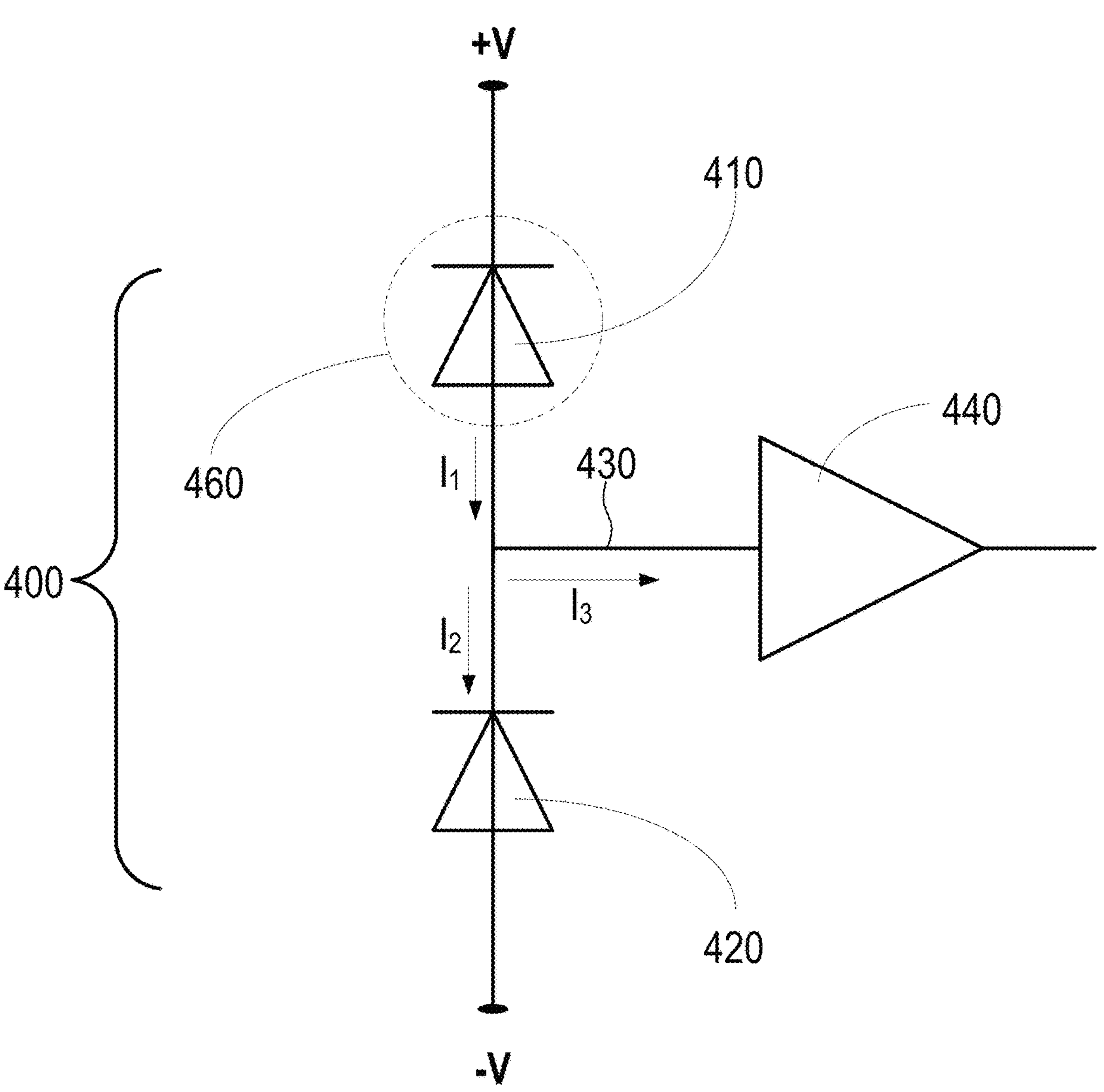
Figure 4F:
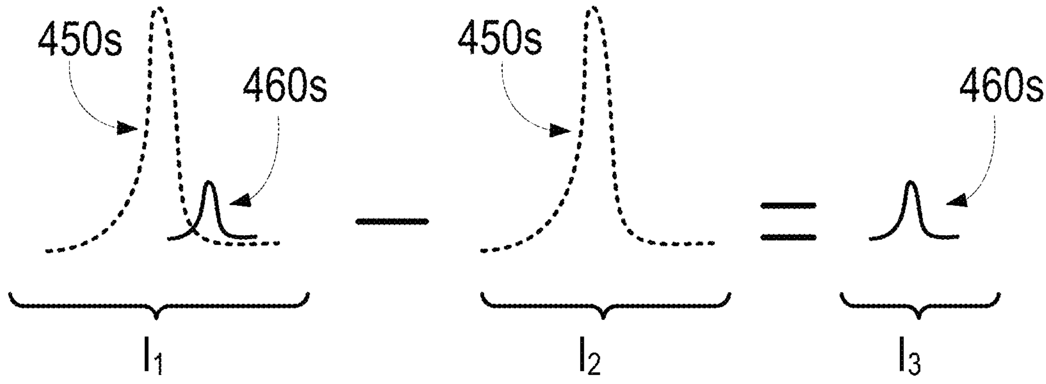
FIGS. 4F-4H are exemplary graphical representations of photocurrents generated by a photodetector pair under various illumination conditions, in accordance with some embodiments.

FIG. 4F includes a schematic representations of exemplary time histories for photocurrents $I_1$ and $I_2$, according to the illumination condition in FIG. 4C. In the depicted example, photocurrent $I_1$ includes a signal pulse 450*s* generated by dazzle signal 450 and a signal pulse 460*s* generated by valid return signal 460. Photocurrent $I_2$ includes only signal pulse 450*s* generated by dazzle signal 450. Because $I_3=I_1-I_2$, as discussed above, photocurrent $I_3$ fed to TIA 400 includes only signal pulse 460*s* generated by valid return signal 460. The configuration of photodetector pair 400 can therefore eliminate (e.g., cancel or filter out) the signal pulse 450*s* caused by dazzle signal 450.

Figure 4G:
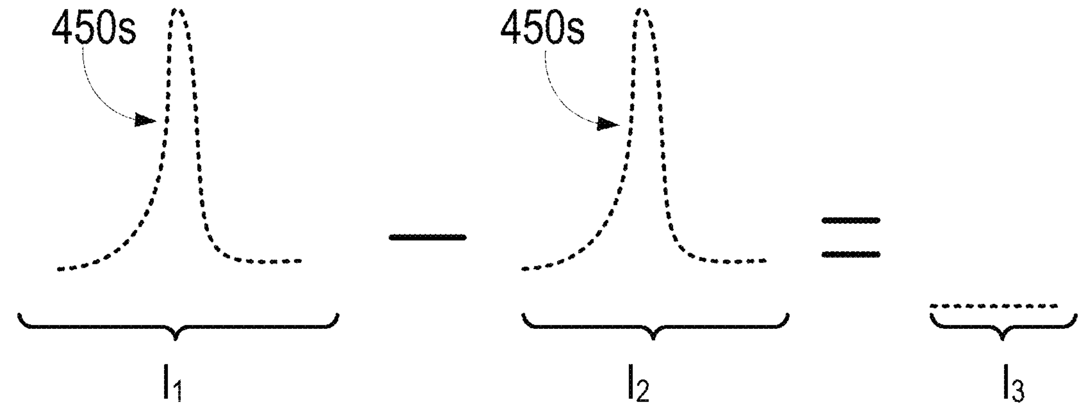

According to some embodiments, FIG. 4D is a schematic representation of another illumination condition in which only dazzle signal 450 illuminates photodetector pair 400 (e.g., there is no valid return signal 460 or other incident illumination on photodetector pair 400). In this case, dazzle signal 450 is a sole contributor for photocurrents $I_1$ and $I_2$, such that photocurrent $I_1$ is equal or comparable to photocurrent $I_2$. Because $I_3=I_1-I_2$, as discussed above, photocurrent $I_3$ is equal to zero or negligible (e.g., within background noise). This is schematically shown in FIG. 4G, where signal pulse 450*s* in photocurrent $I_1$ and photocurrent $I_2$ is not present in photocurrent $I_3$.

Figure 4H:
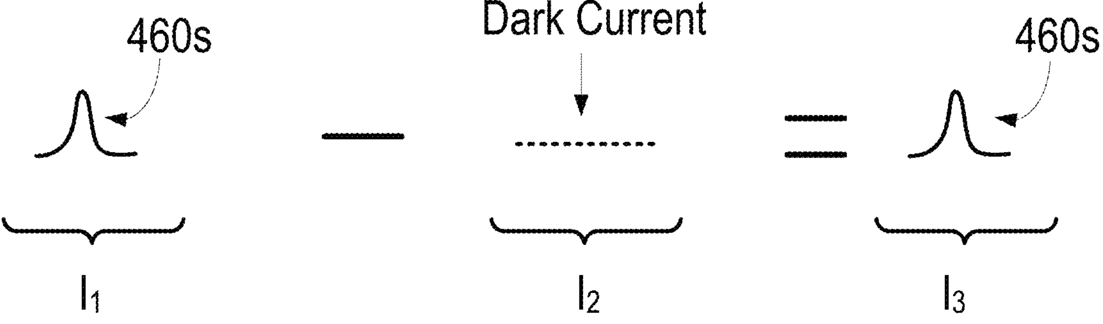

According to some embodiments, FIG. 4E is a schematic representation of yet another potential illumination condition in which valid return signal 460 illuminates first photodetector 410 and there is no illumination of second photodetector 420. In this case, photocurrent $I_1$ is attributed to valid return signal 460. With no illumination of second photodetector 420, photocurrent $I_2$ can be dominated by dark current, which can be negligible compared to $I_1$ (e.g., $I_1>>I_2$). Therefore, according to Kirchhoff's current law, $I_3$ is equal or comparable to $I_2$, as shown schematically in FIG. 4H.

Based on the above, the configuration of photodetector pair 400 is able to prevent saturation of the receiver's output signal under illumination conditions that involve dazzle signals, valid return signals, and combinations thereof. According to some embodiments, photodetector pair 400 can remove (e.g., filter out) the dazzle signal contribution such that photocurrent $I_3$ can correspond to the valid return signal. In some embodiments, the use of photodetector pair 400 in a lidar device can enable detection of near-field objects as close as about 10 cm from the lidar device and for reflectivity down to 1.4%. By comparison, previous lidar devices that do not use photodetector pair 400 may be able to detect near-field objects no closer than about 60 cm (e.g., for objects having any reflectivity value). Thus, in some embodiments, photodetector pair 400 can improve near-field detection by about 83% (e.g., from about 60 cm to about 10 cm).

According to some embodiments, photodetector pair 400 can be applied to all channels of a lidar device to enhance near-field detection. Alternatively, photodetector pair 400 can be applied to a subgroup of channels responsible for near-field detection. According to some embodiments, the configuration of photodetector pair 400 can utilize APD or PIN photodiodes.

According to some embodiments, the photocurrent subtraction taking place (e.g., to generate photocurrent $I_3$) can utilize the circuitry depicted in FIG. 4A and may require no additional circuitry or logic. In general, proper operation of photodetector pair 400 can involve positioning first and second photodetectors 410 and 420 with respect to the focal points or footprints of dazzle signal 450 and valid return signal 460, so that (i) both photodetectors 410 and 420 are illuminated by dazzle signal 450 and (ii) only first photodetector 410 is illuminated by valid return signal 460.

Figure 4I:
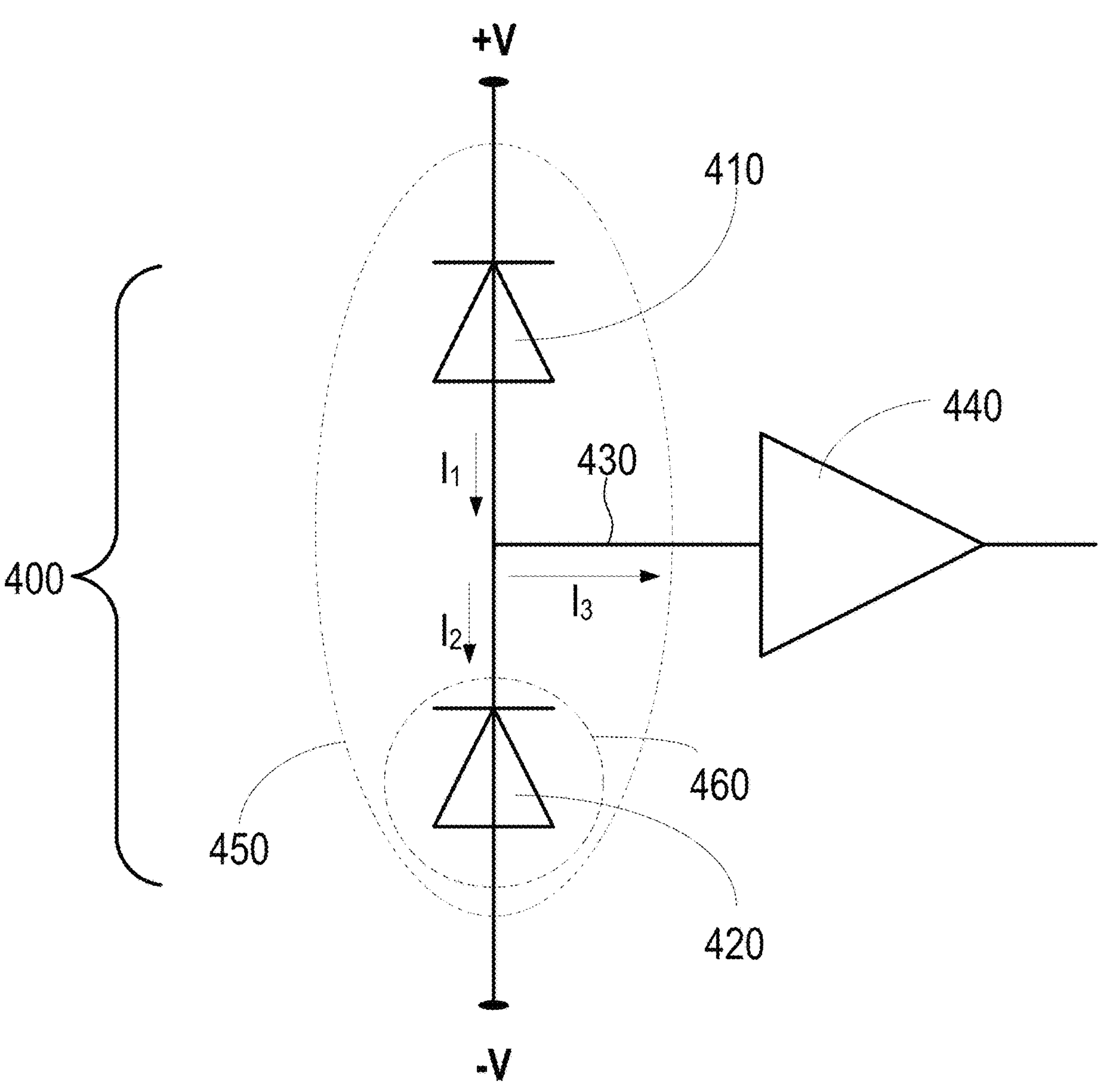
FIG. 4I is a schematic representation of a photodetector pair under an illumination condition, in accordance with some embodiments.
Figure 4J:
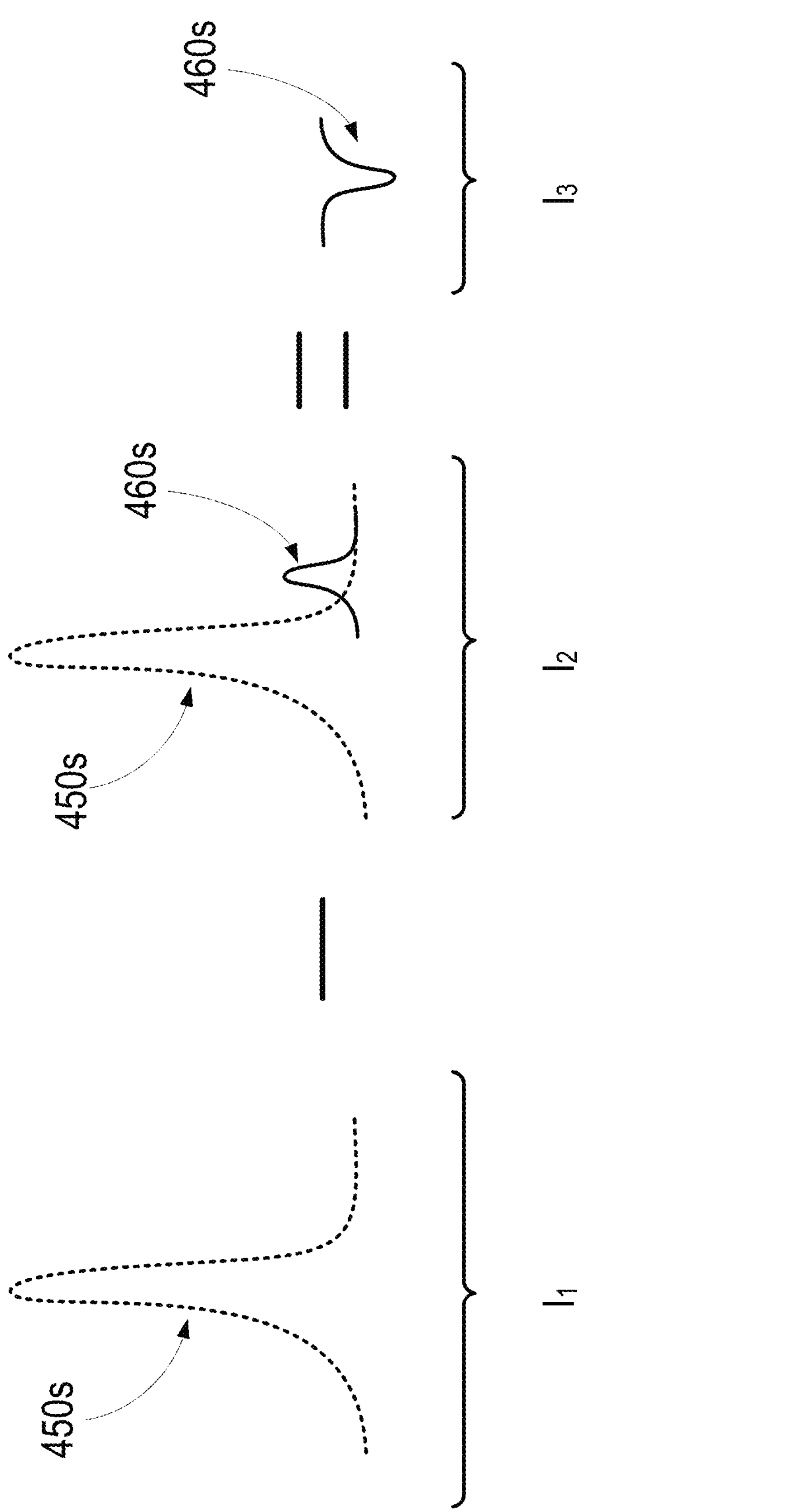
FIG. 4J is an exemplary graphical representation of photocurrents generated by a photodetector pair under an illumination condition, in accordance with some embodiments.

In some embodiments, photodetector pair 400 can work as intended even when dazzle signal 450 illuminates both first and second photodetectors 410 and 420, and only second photodetector 420 is illuminated by valid return signal 460, as shown in FIG. 4I. This is in contrast to the illumination condition described above in which only first photodetector 410 is illuminated by valid return signal 460 (as shown in FIG. 4C). In the illumination condition of FIG. 4I, dazzle signal 450 and valid return signal 460 will both contribute to photocurrent $I_2$ generated in second photodetector 420. Conversely, only dazzle signal 450 will contribute to photocurrent $I_1$ generated in first photodetector 410. FIG. 4J is a schematic representations of exemplary time histories for photocurrents $I_1$ and $I_2$ according to the illumination condition of FIG. 4I. For example, referring to FIG. 4J, photocurrent $I_2$ includes signal pulse 450*s* generated by dazzle signal 450 and signal pulse 460*s* generated by valid return signal 460. Photocurrent $I_1$ includes only a signal pulse 450*s* generated by dazzle signal 450. Because $I_3=I_1-I_2$, as discussed above, the photocurrent fed to TIA 400 (e.g., $I_3$) includes only pulse 460*s* generated by valid return signal 460. In other words, the configuration of photodetector pair 400 can eliminate (e.g., filter out) the contribution of dazzle signal 450 from photocurrent $I_3$ when both dazzle signal 450 and valid return signal 460 are present. In the depicted example, $I_3$ can have a negative value since $I_2$ can be greater than $I_1$ (e.g., $I_2>I_1$).

Figure 4K:
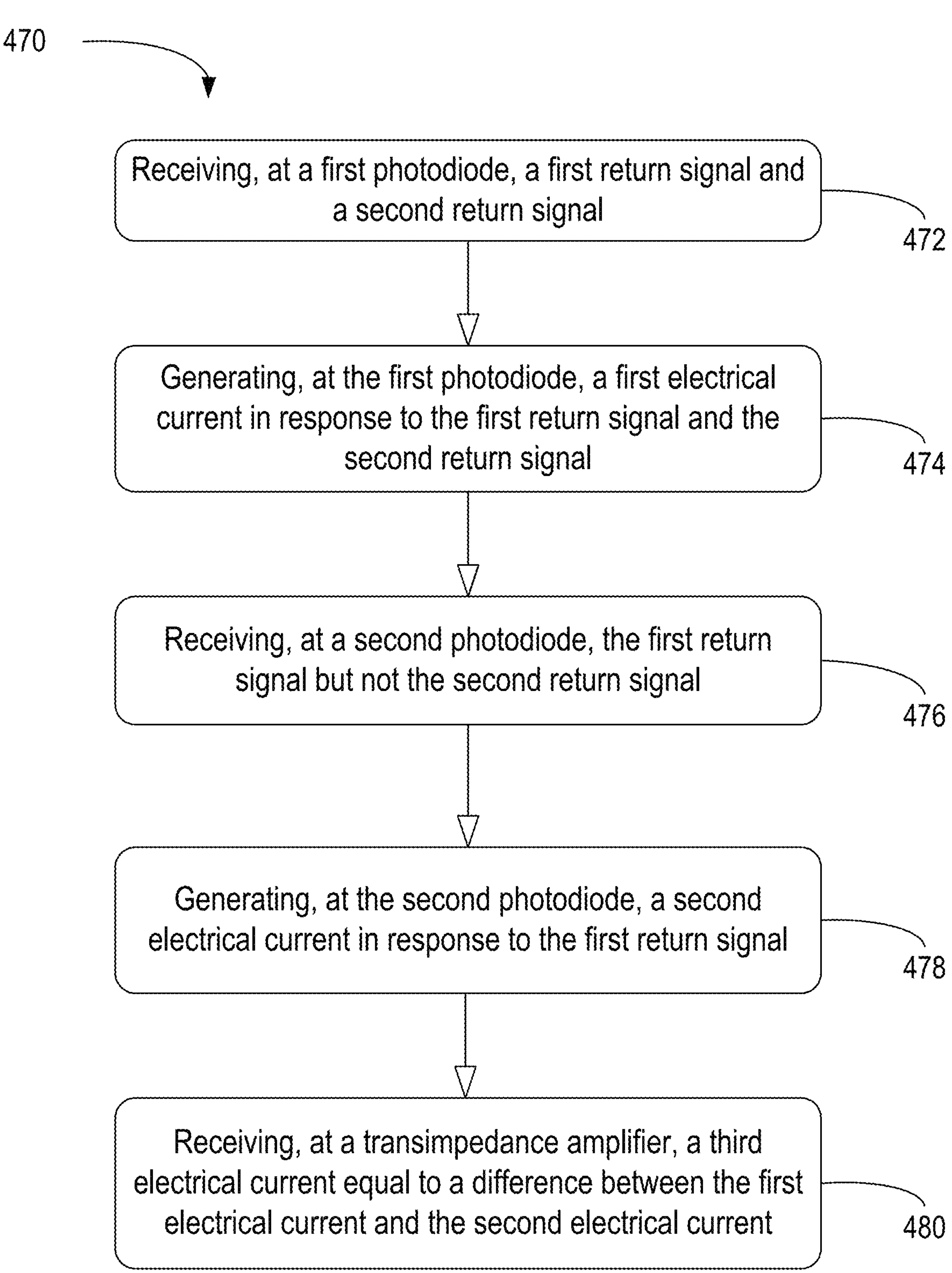
FIG. 4K is a flowchart of a method of cancelling dazzle signals in lidar devices, in accordance with some embodiments.

According to some embodiments, FIG. 4K is a flow chart of a method 470 for cancelling (or filtering out) dazzle signals in lidar devices. Other operations may be performed between the various operations of method 470 and may be omitted merely for clarity. This disclosure is not limited to this operational description. It is to be appreciated that additional operations may be performed. Moreover, not all operations may be needed to perform the disclosure provided herein. Additionally, some or all of the operations may be performed simultaneously, substantially at the same time, or in a different order than shown in FIG. 4K. In some embodiments, one or more other operations may be performed in addition to or in place of the presently described operations. By way of example and not limitation, method 470 will be described with respect to photodetector pair 400 shown in FIG. 4A.

Method 470 begins with operation 472 when a first return signal and a second return signal are received at a first photodetector (e.g., a photodiode). By way of example and not limitation, the first photodetector may correspond to first photodetector 420 from photodetector pair 400, and first and second return signals may correspond to dazzle signal 450 and valid return signal 460, respectively. Method 470 continues with operation 474 at which a first electrical current is generated at the first photodetector in response to the first return signal and the second return signal. For example, the first electrical current may correspond to photocurrent $I_1$ generated at first photodetector 410. Method 470 continues with operation 476 at which a second photodetector (e.g., a photodiode) receives the first return signal but not the second return signal. By way of example and not limitation, the second photodetector may correspond to second photodetector 420 of photodetector pair 400. According to operation 478, a second electrical current is generated at the second photodetector in response to the first return signal. By way of example and not limitation, the second electrical signal may correspond to photocurrent $I_2$ generated at second photodetector 420. Method 470 concludes with operation 480 when an amplifier (e.g., a transimpedance amplifier) receives a third electrical current equal to a difference between the first electrical current and the second electrical current. By way of example and not limitation, the amplifier may correspond to TIA 440, and the third electric current may correspond to $I_3$, which can be equal to the difference between photocurrents $I_1$ and $I_2$ (e.g., $I_1-I_2$). As discussed above, the third electric current (e.g., $I_3$) received by the amplifier (e.g., TIA 440) can include contributions from the second return signal (e.g., valid return signal 460) and may not include contributions from the first return signal (e.g., dazzle signal 450).

Some Examples of Continuous Wave (CW) Lidar Systems

As discussed above, some lidar systems may use a continuous wave (CW) laser to detect the range and/or velocity of targets, rather than pulsed TOF techniques. Such systems include continuous wave (CW) coherent lidar systems and frequency modulated continuous wave (FMCW) coherent lidar systems. For example, any of the lidar systems 100, 202, 250, and 270 described above can be configured to operate as a CW coherent lidar system or an FMCW coherent lidar system.

Lidar systems configured to operate as CW or FMCW systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and immunity to interference from solar glare and other light sources, including other lidar systems and devices.

Figure 6:
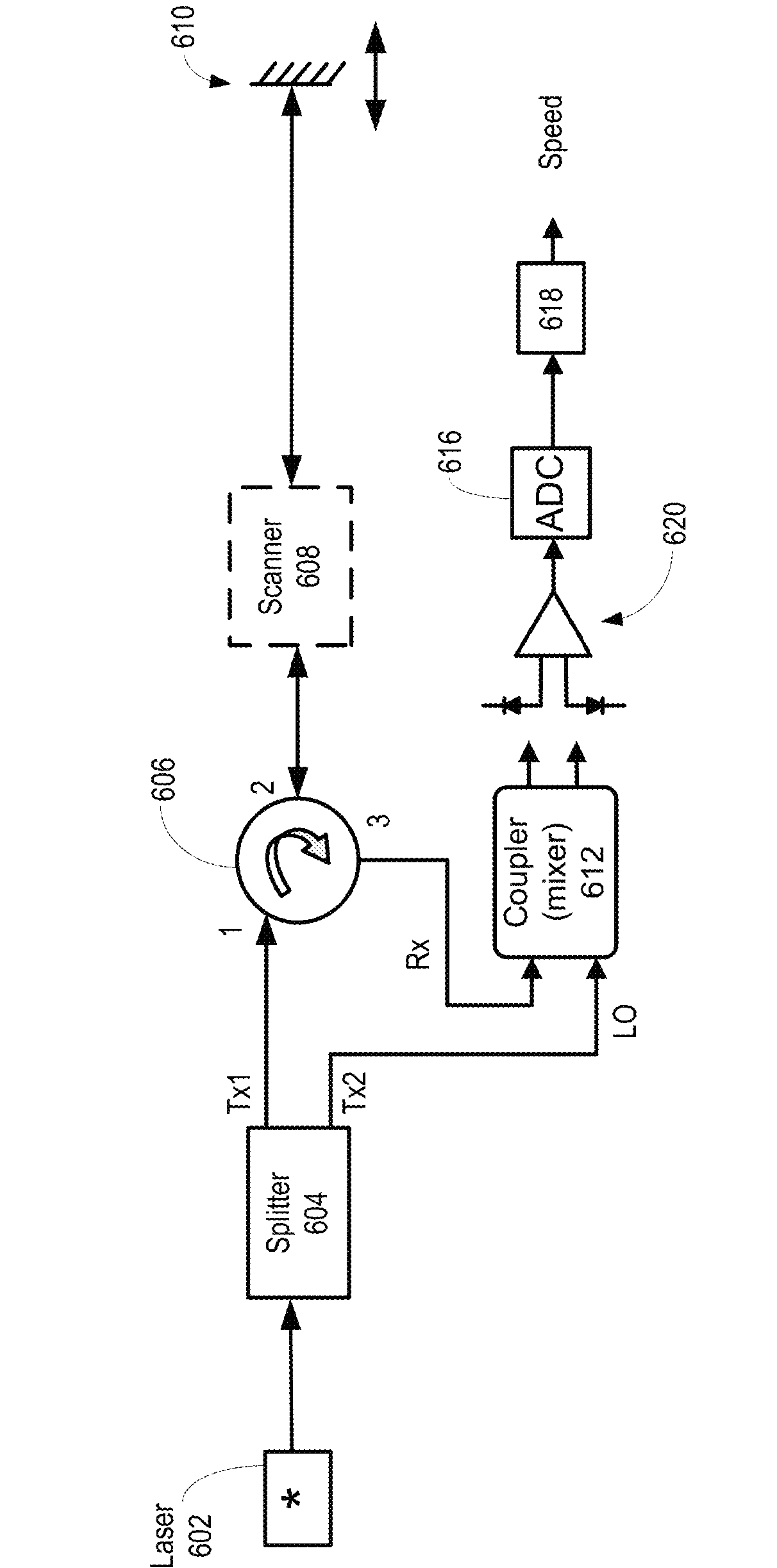
FIG. 6 is an illustration of an example continuous wave (CW) coherent lidar system, in accordance with some embodiments.

FIG. 6 illustrates an exemplary CW coherent lidar system 600 configured to determine the radial velocity (or speed) of a target. Lidar system 600 includes a laser 602 configured to produce a laser signal which is provided to a splitter 604. The laser 602 may provide a laser signal having a substantially constant laser frequency.

In one example, the splitter 604 provides a first split laser signal Tx1 to a direction selective device 606, which provides (e.g., forwards) the signal Tx1 to a scanner 608. In some examples, the direction selective device 606 is a circulator. The scanner 608 uses the first laser signal Tx1 to transmit light emitted by the laser 602 and receives light reflected by the target 610 (e.g., "reflected light" or "reflections"). The reflected light signal Rx is provided (e.g., passed back) to the direction selective device 606. The second laser signal Tx2 (provided by the splitter 604) and the reflected light signal Rx are provided to a coupler (also referred to as a mixer) 612. The mixer may use the second laser signal Tx2 as a local oscillator (LO) signal and mix it with the reflected light signal Rx. The mixer 612 may be configured to mix the reflected light signal Rx with the local oscillator signal LO. The mixer 612 may provide the mixed optical signal to differential photodetector 614, which may generate an electrical signal representing the beat frequency $f_{beat}$ of the mixed optical signals, where $f_{beat}=|f_{Tx2}-f_{Rx}|$ (the absolute value of the difference between the frequencies of the mixed optical signals). In some embodiments, the current produced by the differential photodetector 614 based on the mixed light may have the same frequency as the beat frequency $f_{beat}$. The current may be converted to a voltage by an amplifier (e.g., a transimpedance amplifier (TIA)), which may be provided (e.g., fed) to an analog-to-digital converter (ADC) 616 configured to convert the analog voltage signal to digital samples for a target detection module 618. The target detection module 618 may be configured to determine (e.g., calculate) the radial velocity of the target 610 based on the digital sampled signal with the beat frequency $f_{beat}$.

In one example, the target detection module 618 may identify Doppler frequency shifts using the beat frequency $f_{beat}$ and determine the radial velocity of the target 610 based on those shifts. For example, the radial velocity of the target 610 can be calculated using the following relationship:

$$f_d = \frac{2}{\lambda} v_t$$

where, $f_d$ is the Doppler frequency shift, X is the wavelength of the laser signal, and $v_t$ is the radial velocity of the target 610. In some examples, the direction of the target 610 is indicated by the sign of the Doppler frequency shift $f_d$. For example, a positive signed Doppler frequency shift may indicate that the target 610 is traveling towards the system 600 and a negative signed Doppler frequency shift may indicate that the target 610 is traveling away from the system 600.

In one example, a Fourier Transform calculation is performed using the digital samples from the ADC 616 to recover the desired frequency content (e.g., the Doppler frequency shift) from the digital sampled signal. For example, a controller (e.g., target detection module 618) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the lidar system 600 is described above as being configured to determine the radial velocity of a target, it should be appreciated that the system can be configured to determine the range and/or radial velocity of a target. For example, the lidar system 600 can be modified to use laser chirps to detect the velocity and/or range of a target.

Some examples have been described in which a DFT is used to generate points of a point cloud based on a group of samples. However, frequency analysis techniques (e.g., spectrum analysis techniques) other than the DFT may be used to generate points of a point cloud based on a group of samples. Any suitable frequency analysis technique may be used, including, without limitation, Discrete Cosine transform (DCT), Wavelet transform, Auto-Regressive moving average (ARMA), etc.

Figure 7:
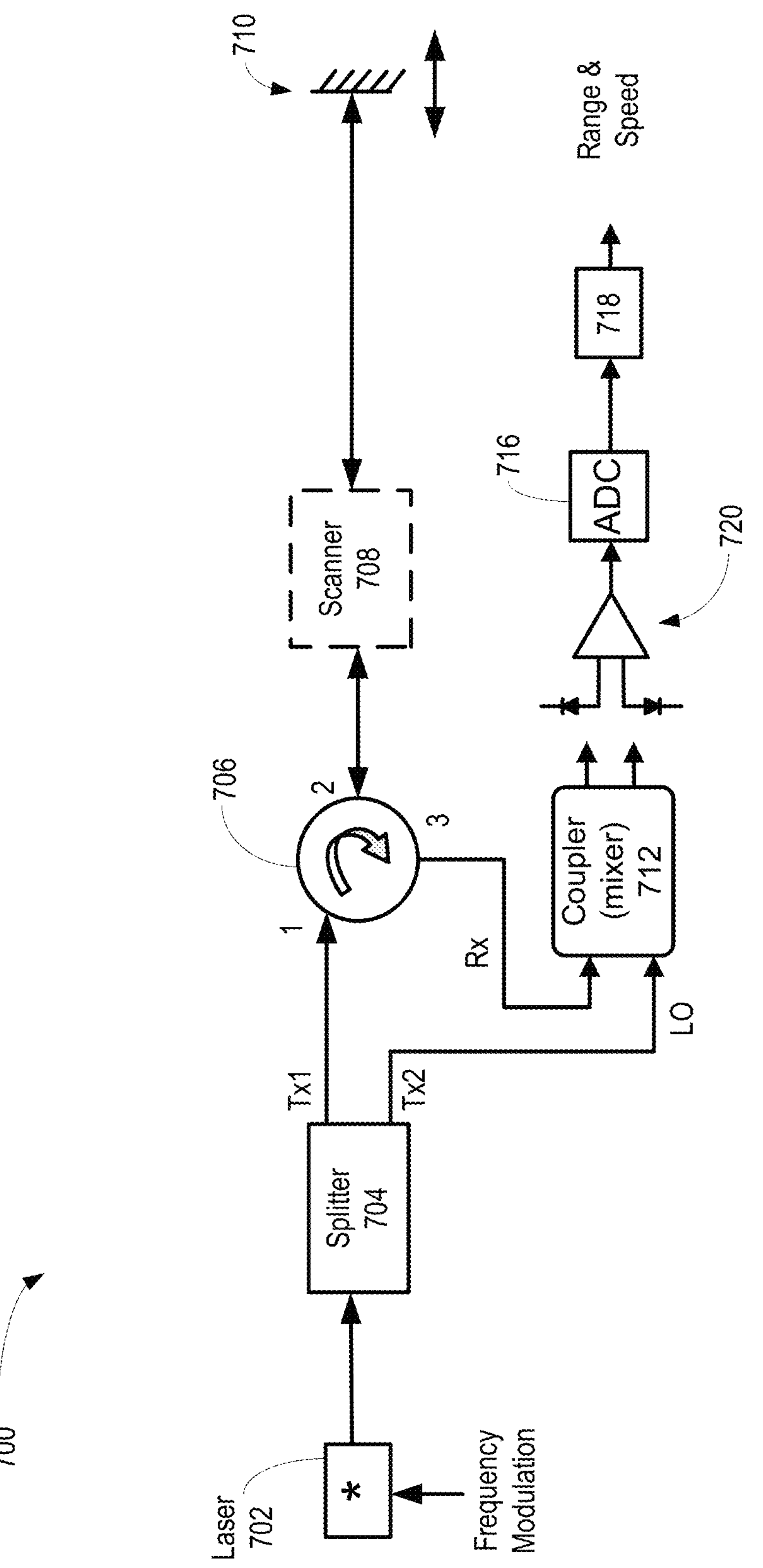
FIG. 7 is an illustration of an example frequency modulated continuous wave (FMCW) coherent lidar system, in accordance with some embodiments.

FIG. 7 illustrates an exemplary FMCW coherent lidar system 700 configured to determine the range and/or radial velocity of a target. Lidar system 700 includes a laser 702 configured to produce a laser signal which is fed into a splitter 704. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 702; however, in other examples, an external modulator can be placed between the laser source 702 and the splitter 704.

In other examples, the laser frequency can be "chirped" by modulating the phase of the laser signal (or light) produced by the laser 702. In one example, the phase of the laser signal is modulated using an external modulator placed between the laser source 702 and the splitter 704; however, in some examples, the laser source 702 may be modulated directly by changing operating parameters (e.g., current/voltage) or may include an internal modulator. Similar to frequency chirping, the phase of the laser signal can be increased ("ramped up") or decreased ("ramped down") over time.

Some examples of systems with FMCW-based lidar sensors have been described. However, some embodiments of the techniques described herein may be implemented using any suitable type of lidar sensors including, without limitation, any suitable type of coherent lidar sensors (e.g., phase-modulated coherent lidar sensors). With phase-modulated coherent lidar sensors, rather than chirping the frequency of the light produced by the laser (as described above with reference to FMCW techniques), the lidar system may use a phase modulator placed between the laser 702 and the splitter 704 to generate a discrete phase modulated signal, which may be used to measure range and radial velocity.

As shown, the splitter 704 provides a first split laser signal Tx1 to a direction selective device 706, which provides (e.g., forwards) the signal Tx1 to a scanner 708. The scanner 708 uses the first laser signal Tx1 to transmit light emitted by the laser 702 and receives light reflected by the target 710. The reflected light signal Rx is provided (e.g., passed back) to the direction selective device 706. The second laser signal Tx2 and reflected light signal Rx are provided to a coupler (also referred to as a mixer) 712. The mixer may use the second laser signal Tx2 as a local oscillator (LO) signal and mix it with the reflected light signal Rx. The mixer 712 may be configured to mix the reflected light signal Rx with the local oscillator signal LO to generate a beat frequency $f_{beat}$. The mixed signal with beat frequency $f_{beat}$ may be provided to a differential photodetector 714 configured to produce a current based on the received light. The current may be converted to voltage by an amplifier (e.g., a transimpedance amplifier (TIA)), which may be provided (e.g., fed) to an analog-to-digital converter (ADC) 716 configured to convert the analog voltage to digital samples for a target detection module 718. The target detection module 718 may be configured to determine (e.g., calculate) the range and/or radial velocity of the target 710 based on the digital sample signal with beat frequency $f_{beat}$.

In some embodiments, each photodetector 620 and 720 of the coherent lidar systems (600, 700) illustrated in FIGS. 6 and 7 may be implemented using a photodetector pair, such as photodetector pair 400 shown in FIG. 4A.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{ (given a perfectly linear chirp), and}$$

$$\text{Range: } R = \frac{f_{beat} c T_{ChirpRamp}}{2\,BW}$$

where c is the speed of light, BW is the bandwidth of the chirped laser signal, $f_{beat}$ is the beat frequency, and $T_{Chirp\text{-}Ramp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent lidar systems may rely on two measurements having different slopes (e.g., negative and positive slopes) to remove this ambiguity. The two measurements having different slopes may also be used to determine range and velocity measurements simultaneously.

Figures 8A, 8B:
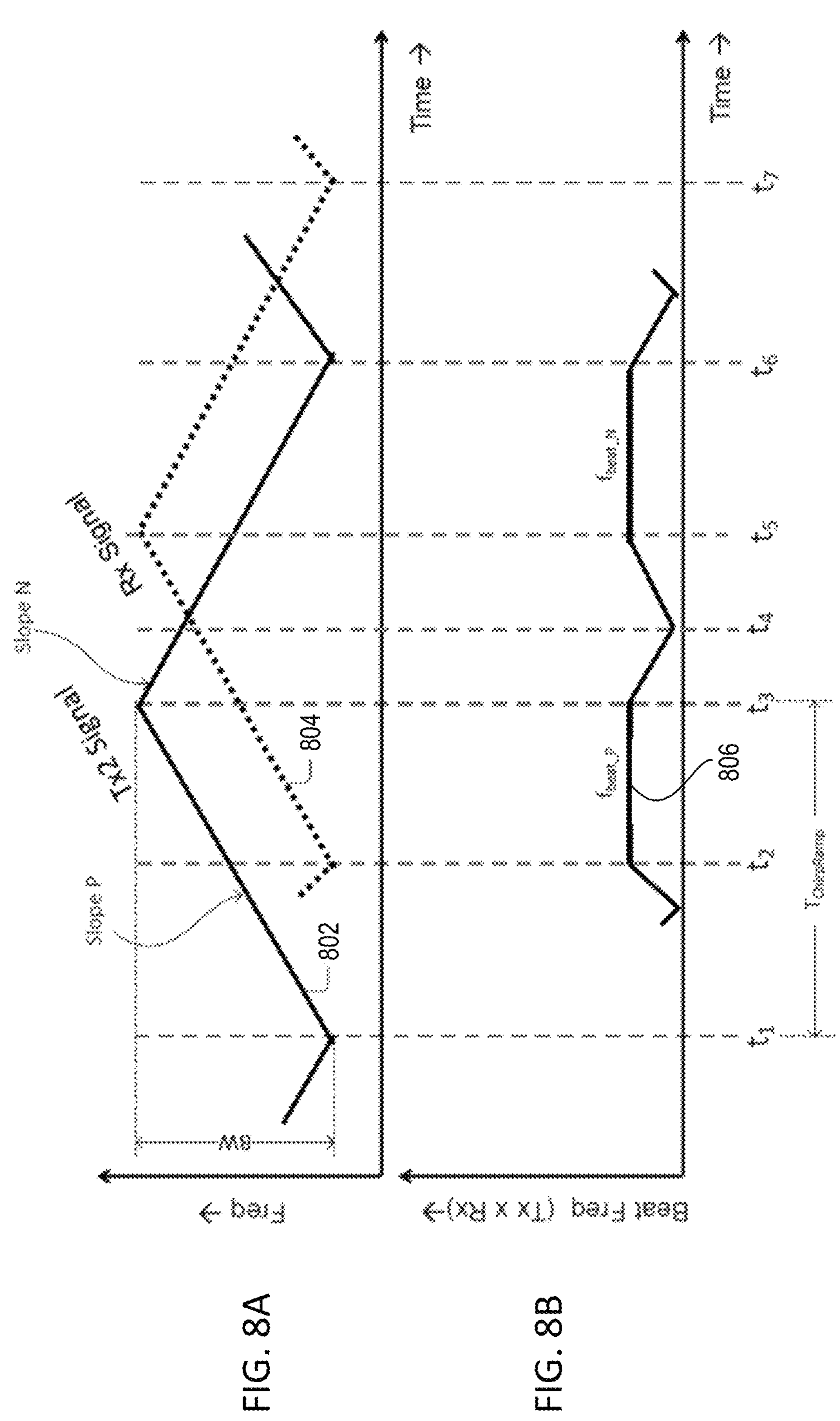
FIG. 8A is a plot of a frequency chirp as a function of time in a transmitted laser signal and reflected signal, in accordance with some embodiments.
FIG. 8B is a plot illustrating a beat frequency of a mixed signal, in accordance with some embodiments.

FIG. 8A is a plot of ideal (or desired) frequency chirp as a function of time in the transmitted laser signal Tx (e.g., signal Tx2), depicted in solid line 802, and reflected light signal Rx, depicted in dotted line 804. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 8B is a plot illustrating the corresponding ideal beat frequency $f_{beat}$ 806 of the mixed signal Tx2×Rx. Note that the beat frequency $f_{beat}$ 806 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 8A-8B, when the positive and negative ramp pair is used to measure range and velocity simultaneously, the following relationships are utilized:

$$\text{Range: } R = \frac{cT_{ChirpRamp}\frac{(f_{beat\_P} + f_{beat\_N})}{2}}{2BW}, \text{ and}$$

$$\text{Velocity: } V = \frac{\lambda\frac{(f_{beat\_P} - f_{beat\_N})}{2}}{2}$$

where $f_{beat}$_P and $f_{beat}$ N are beat frequencies generated during positive (P) and negative (N) slopes of the chirp 802 respectively and X is the wavelength of the laser signal.

In one example, the scanner 708 of the lidar system 700 is used to scan the environment and generate a target point cloud from the acquired scan data. In some examples, the lidar system 700 can use processing methods that include performing one or more Fourier Transform calculations, such as a Fast Fourier Transform (FFT) or a Discrete Fourier Transform (DFT), to generate the target point cloud from the acquired scan data. Being that the system 700 is capable of measuring range, each point in the point cloud may have a three-dimensional location (e.g., x, y, and z) in addition to radial velocity. In some examples, the x-y location of each target point corresponds to a radial position of the target point relative to the scanner 708. Likewise, the z location of each target point corresponds to the distance between the target point and the scanner 708 (e.g., the range). In one example, each target point corresponds to one frequency chirp 802 in the laser signal. For example, the samples collected by the system 700 during the chirp 802 (e.g., t1 to t6) can be processed to generate one point in the point cloud.

Additional Embodiments, Computing Devices, and Information Handling Systems

Figure 9:
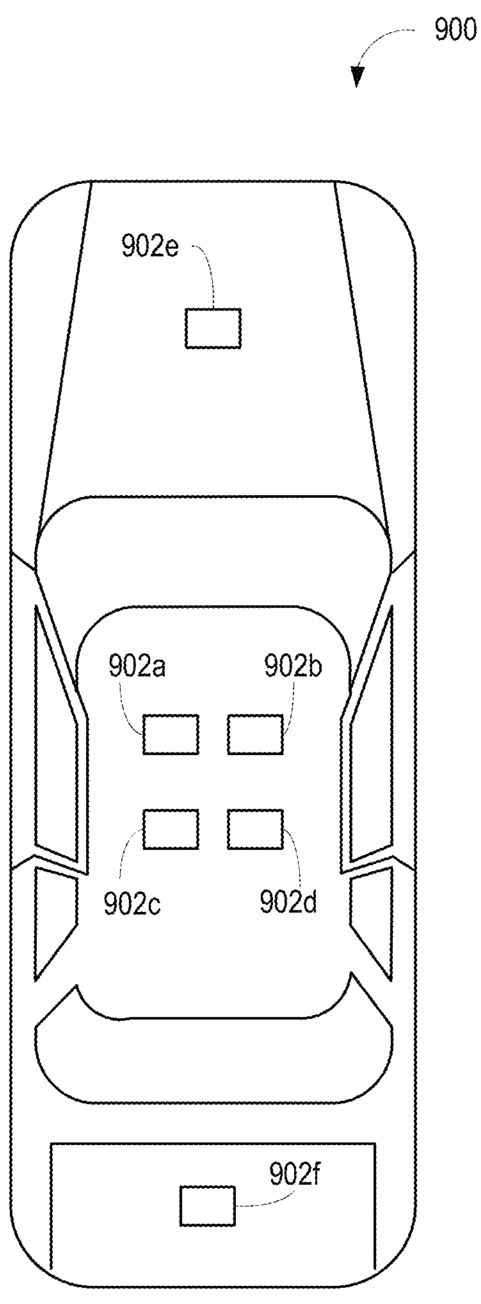
FIG. 9 is a schematic diagram of a vehicle having a plurality of sensors attached thereon, in accordance with some embodiments.

In some embodiments, lidar systems and techniques described herein may be used to provide mapping and/or autonomous navigation for a vehicle. FIG. 9 illustrates a vehicle 900 having a plurality of sensors 902. As shown, a first sensor 902*a*, a second sensor 902*b*, a third sensor 902*c*, and a fourth sensor 902*d* may be positioned in a first location on (or inside) the vehicle 900 (e.g., the roof). Likewise, a fifth sensor 902*e* may be positioned in a second location on (or inside) the vehicle 900 (e.g., the front of the vehicle 900) and a sixth sensor 902*f* may be positioned in a third location on (or inside) the vehicle 900 (e.g., the back of the vehicle 900). In other examples, a different number or configuration of sensors may be used.

In some examples, at least one sensor of the plurality of sensors 902 is configured to provide (or enable) 3D mapping of the vehicle's surroundings. In certain examples, at least one sensor of the plurality of sensors 902 is used to provide autonomous navigation for the vehicle 900 within an environment. In one example, each sensor 902 includes at least one lidar system, device, or chip. The lidar system(s) included in each sensor 902 may include any of the lidar systems disclosed herein. In some examples, at least one sensor of the plurality of sensors 902 may be a different type of sensor (e.g., camera, radar, etc.). In one example, the vehicle 900 is a car; however, in other examples, the vehicle 900 may be a truck, boat, plane, drone, vacuum cleaner (e.g., robot vacuum cleaner), robot, train, tractor, ATV, or any other type of vehicle or moveable object.

In some embodiments, lidar systems and techniques described herein may be implemented using Silicon photonics (SiP) technologies. SiP is a material platform from which photonic integrated circuits (PICs) can be produced. SiP is compatible with CMOS (electronic) fabrication techniques, which allows PICs to be manufactured using established foundry infrastructure. In PICs, light propagates through a patterned silicon optical medium that lies on top of an insulating material layer (e.g., silicon on insulator (SOI)). In some cases, direct bandgap materials (e.g., indium phosphide (InP)) are used to create light (e.g., laser) sources that are integrated in an SiP chip (or wafer) to drive optical or photonic components within a photonic circuit. SiP technologies are increasingly used in optical datacom, sensing, biomedical, automotive, astronomy, aerospace, augmented reality (AR) applications, virtual reality (VR) applications, artificial intelligence (AI) applications, navigation, image identification, drones, robotics, etc.

Figure 10:
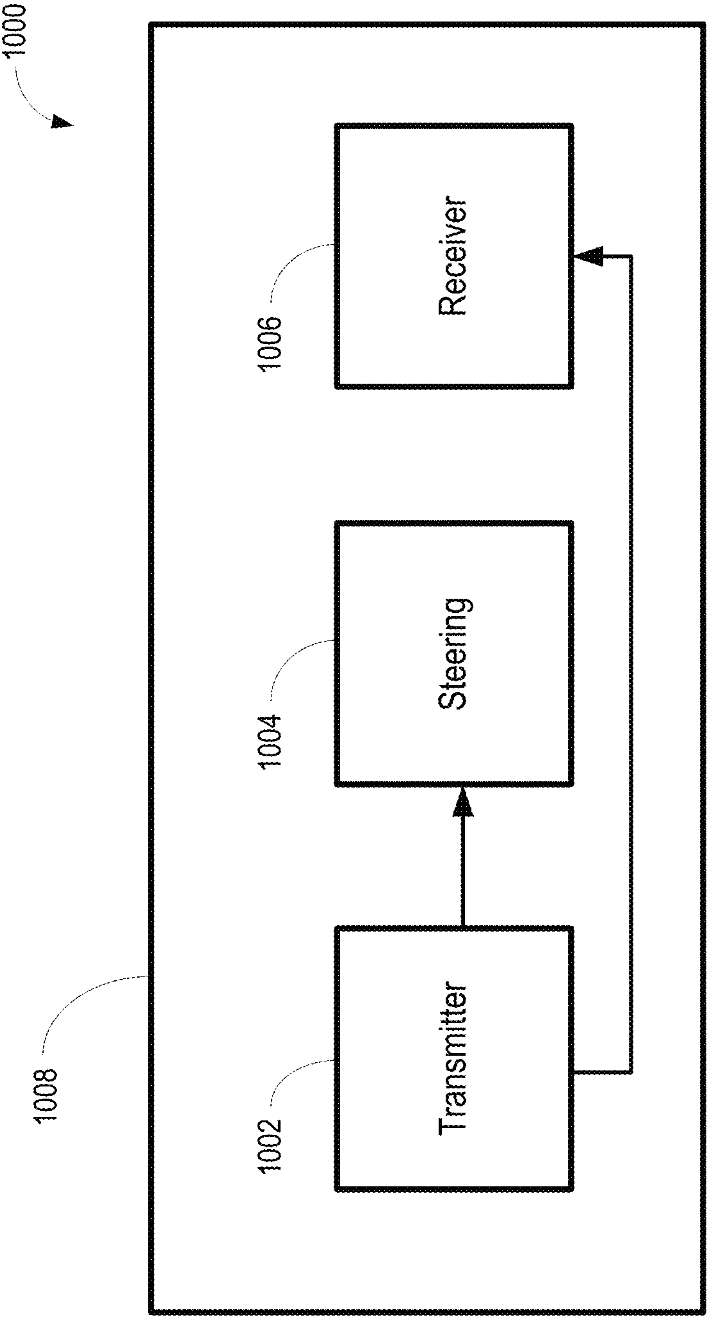
FIG. 10 is a block diagram of a silicon photonic integrated circuit (PIC), in accordance with some embodiments.

FIG. 10 is a block diagram of a silicon photonic integrated circuit (PIC) 1000 in accordance with aspects described herein. In one example, the lidar systems described herein can be implemented as the PIC 1000. The PIC 1000 includes a transmitter module 1002, a steering module 1004, and a receiver module 1006. As shown, the transmitter module 1002, the steering module 1004, and the receiver module 1006 are integrated on a silicon substrate 1008. In other examples, the transmitter module 1002, the steering module 1004, or the receiver module 1006 may be included on a separate substrate. In some embodiments, the steering module 1004 is used by the PIC 1000 in connection with transmission (e.g., emission) and reception (e.g., collection) of optical signals. In some examples, the silicon substrate 1008 is an SOI substrate with a silicon layer (e.g., between 200 nm and 10 micron thick) disposed over an oxide layer (e.g., approximately 2 micron thick). In certain examples, the silicon substrate 1008 can include multiple silicon and/or oxide layers.

In one example, the transmitter module 1002 includes at least one laser source. In some examples, the laser source(s) are implemented using a direct bandgap material (e.g., InP) and integrated on the silicon substrate 1008 via hybrid integration. The transmitter module 1002 may also include at least one splitter, a combiner, and/or a direction selective device that are implemented on the silicon substrate 1008 via monolithic or hybrid integration. In some examples, the laser source(s) are external to the PIC 1000 and the laser signal(s) can be provided to the transmission module 1002.

In some embodiments, lidar systems and techniques described herein may be implemented using micro-electro-mechanical system (MEMS) devices. A MEMS device is a miniature device that has both mechanical and electronic components. The physical dimension of a MEMS device can range from several millimeters to less than one micrometer. Lidar systems may include one or more scanning mirrors implemented as a MEMS mirror (or an array of MEMS mirrors). Each MEMS mirror may be a single-axis MEMS mirror or dual-axis MEMS mirror. The MEMS mirror(s) may be electromagnetic mirrors. A control signal is provided to adjust the position of the mirror to direct light in at least one scan direction (e.g., horizontal and/or vertical). The MEMS mirror(s) can be positioned to steer light transmitted by the lidar system and/or to steer light received by the lidar system. MEMS mirrors are compact and may allow for smaller form-factor lidar systems, faster control speeds, and more precise light steering compared to other mechanical-scanning lidar methods. MEMS mirrors may be used in solid-state (e.g., stationary) lidar systems and rotating lidar systems.

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), network storage device, or any other suitable device and may vary in size, shape, performance, functionality, and price.

Figure 11:
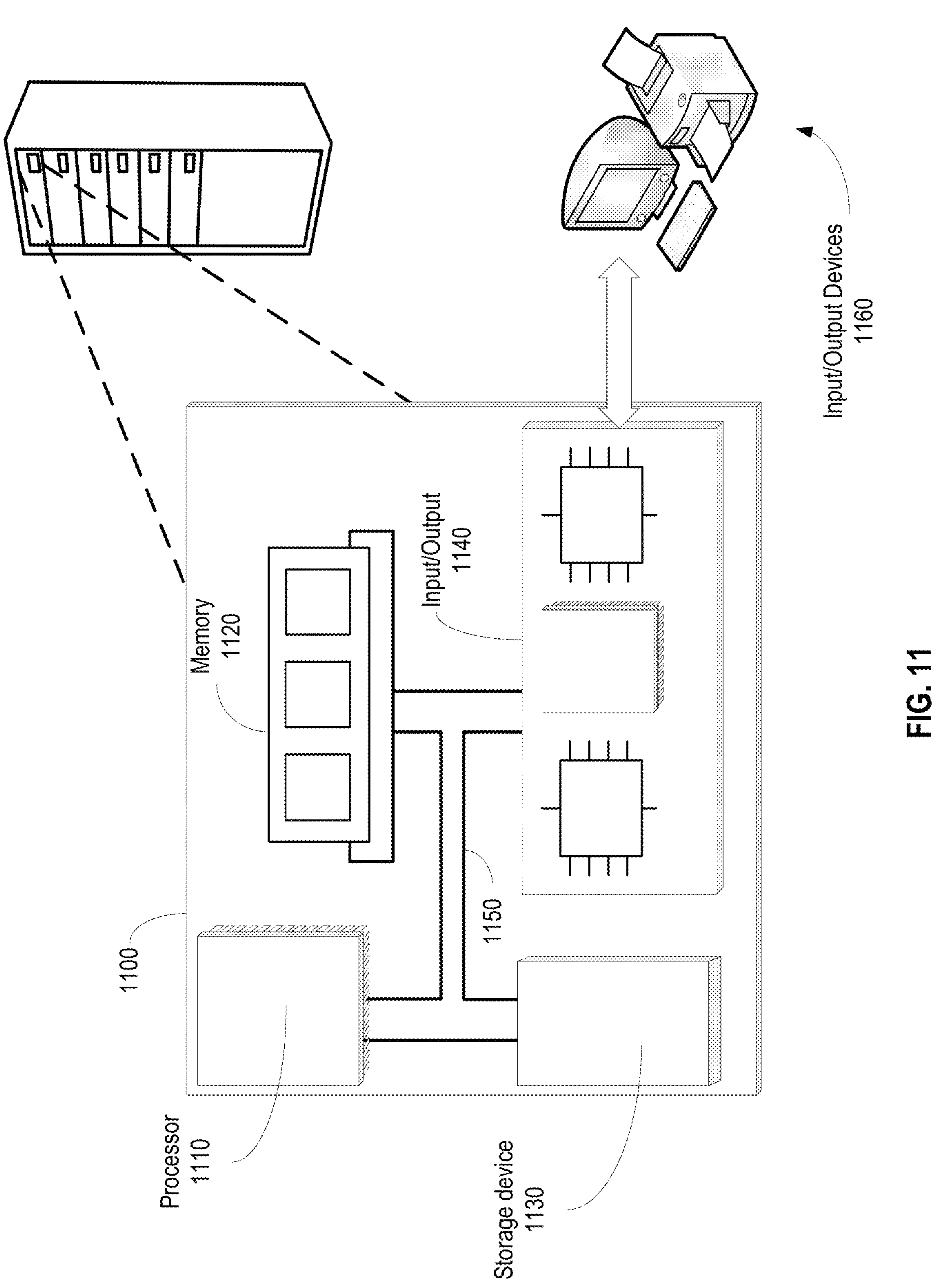
FIG. 11 is a block diagram of an example computer system, in accordance with some embodiments.

FIG. 11 is a block diagram of an example computer system 1100 that may be used in implementing the technology described in this document. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. In some implementations, the processor 1110 is a programmable (or reprogrammable) general purpose microprocessor or microcontroller. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a non-volatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-date drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, for example as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 12:
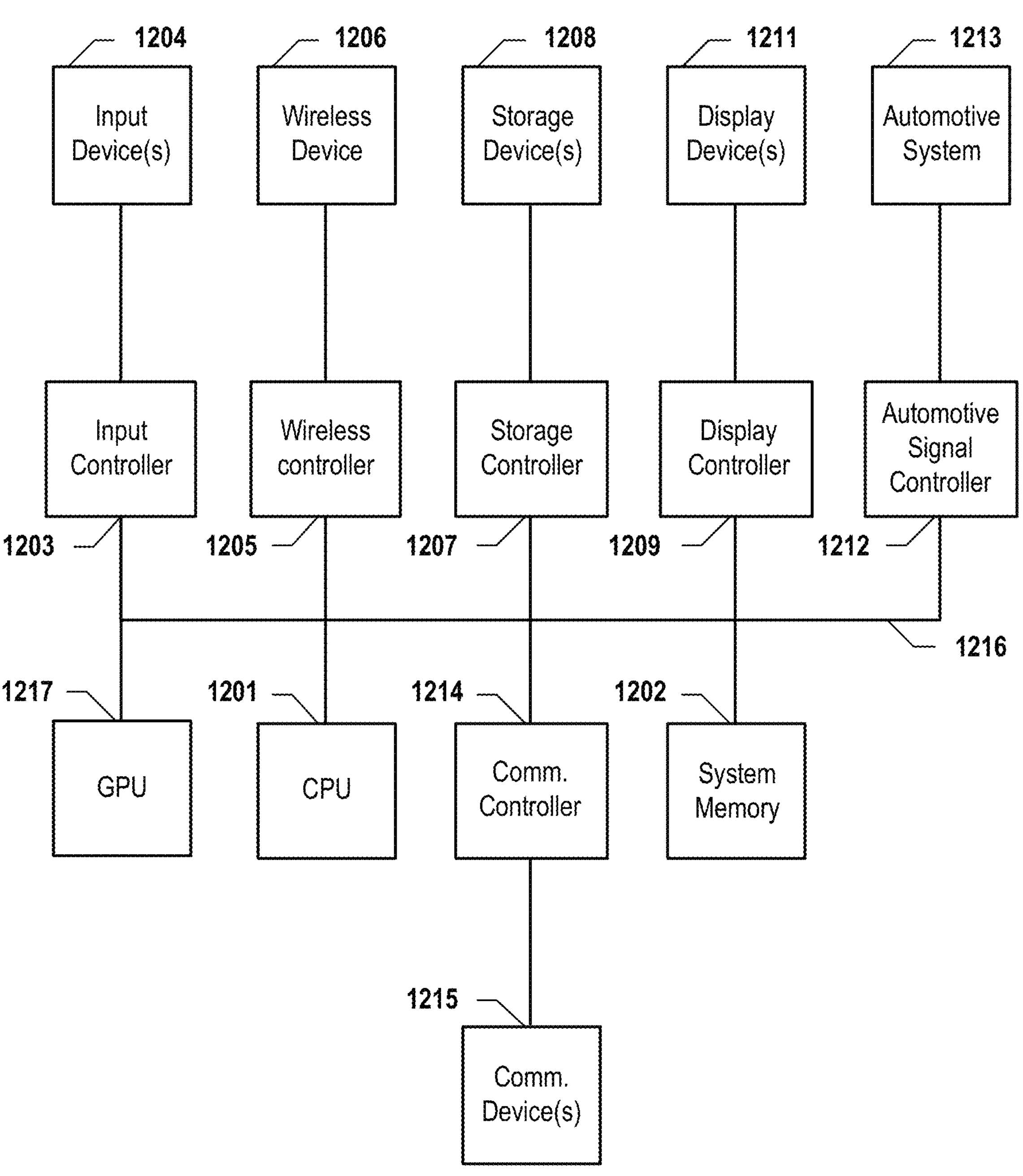
FIG. 12 is a block diagram of a computing device/information handling system, in accordance with some embodiments.

FIG. 12 depicts a simplified block diagram of a computing device/information handling system (or computing system) according to embodiments of the present disclosure. It will be understood that the functionalities shown for system 1200 may operate to support various embodiments of an information handling system—although it shall be understood that an information handling system may be differently configured and include different components.

As illustrated in FIG. 12, system 1200 includes one or more central processing units (CPU) 1101 that provide(s) computing resources and control(s) the computer. CPU 1201 may be implemented with a microprocessor or the like, and may also include one or more graphics processing units (GPU) 1217 and/or a floating point coprocessor for mathematical computations. System 1200 may also include a system memory 1202, which may be in the form of random-access memory (RAM), read-only memory (ROM), or both.

A number of controllers and peripheral devices may also be provided. For example, an input controller 1203 represents an interface to various input device(s) 1204, such as a keyboard, mouse, or stylus. There may also be a wireless controller 1205, which communicates with a wireless device 1206. System 1200 may also include a storage controller 1207 for interfacing with one or more storage devices 1208, each of which includes a storage medium such as a magnetic tape or disk, or an optical medium that might be used to record programs of instructions for operating systems, utilities, and applications, which may include embodiments of programs that implement various aspects of the techniques described herein. Storage device(s) 1208 may also be used to store processed data or data to be processed in accordance with some embodiments. System 1200 may also include a display controller 1209 for providing an interface to a display device 1211, which may be a cathode ray tube (CRT), a thin film transistor (TFT) display, or other type of display. The computing system 1200 may also include an automotive signal controller 1212 for communicating with an automotive system 1213. A communications controller 1214 may interface with one or more communication devices 1215, which enables system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

In embodiments, aspects of the techniques described herein (e.g., timing the emission of optical signals, processing received return signals, generating point clouds, performing one or more (e.g., all) of the steps of the methods described herein, etc.) may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

As used herein, "spatial data" may refer to data relating to the location, shape, and/or geometry of one or more spatial objects. Data collected by lidar systems, devices, and chips described herein may be considered spatial data. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment). In some cases, a spatial object may be represented as a cluster of points in a 3D point-cloud.

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

"Computer vision" generally refers to the use of computer systems to analyze and interpret image data. In some embodiments, computer vision may be used to analyze and interpret data collected by lidar systems (e.g., point-clouds). Computer vision tools generally use models that incorporate principles of geometry and/or physics. Such models may be trained to solve specific problems within the computer vision domain using machine learning techniques. For example, computer vision models may be trained to perform object recognition (recognizing instances of objects or object classes in images), identification (identifying an individual instance of an object in an image), detection (detecting specific types of objects or events in images), etc.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), or high-level (e.g., objects, scenes, events, etc.). The detection/segmentation function may involve selection of a subset of the input image data (e.g., one or more images within a set of images, one or more regions within an image, etc.) for further processing.

SOME EMBODIMENTS

Some embodiments may include any of the following:

A1. A lidar device comprising: a transmitter configured to transmit optical signals; and a receiver configured to receive return signals based on the optical signals, the receiver comprising: a first photodetector configured to (i) receive a first return signal and a second return signal and (ii) generate a first electrical current in response to the first return signal and the second return signal; a second photodetector configured to (i) receive the first return signal but not the second return signal and (ii) generate a second electrical current in response to the first return signal; and an amplifier configured to receive a third electrical current equal to a difference between the first electrical current and the second electrical current.

A2. The lidar device of clause A1, wherein the first and second photodetectors photodiodes are avalanche photodiodes or p-i-n junction (PIN) photodiodes.

A3. The lidar device of clause A1 or A2, wherein the first and second photodetectors photodiodes are disposed relative to one another such that (i) a footprint of the first return signal covers the first and second photodetectorsphotodiodes and (ii) a footprint of the second return signal covers the first photodetector photodiode but not the second photodetectorphotodiode.

A4. The lidar device of any of clauses A1 to A3, wherein the first and second photodetectors photodiodes are disposed on and electrically coupled to a circuit board.

A5. The lidar device of any of clauses A1 to A4, wherein the first return signal comprises a dazzle signal, and wherein the second return signal comprises a reflection of an optical signal emitted into an environment outside the lidar device.

A6. The lidar device of any of clauses A1 to A5, wherein the dazzle signal comprises a scattering/reflection or scattering of an optical signal off a component inside the lidar device.

A7. The lidar device of any of clauses A1 to A6, wherein the first photodetector photodiode comprises a first anode and a first cathode, wherein the second photodetector photodiode comprises a second anode and a second cathode, wherein the first cathode is electrically coupled to a positive voltage, wherein the second anode is electrically coupled to a negative voltage, and wherein the first anode is electrically coupled to the second cathode.

A8. The lidar device of any of clauses A1 to A7, wherein the transimpedance amplifier is electrically coupled to the first anode.

A9. The lidar device of any of clauses A1 to A8, wherein the third electrical current corresponds to the second return signal.

A10. The lidar device of any of clauses A1 to A9, wherein the amplifier comprises a transimpedance amplifier is configured to output a voltage corresponding to the second return signal.

A11. A lidar method comprising: providing a lidar device comprising: a transmitter configured to transmit optical signals; and a receiver configured to receive return signals based on the optical signals, the receiver comprising a first photodetector, a second photodetector, and an amplifier; receiving, at the first photodetector, a first return signal and a second return signal; generating, at the first photodetector, a first electrical current in response to the first return signal and the second return signal; receiving, at the second photodetector, the first return signal but not the second return signal; generating, at the second photodetector, a second electrical current in response to the first return signal; and receiving, at the amplifier, a third electrical current equal to a difference between first electrical current and the second electrical current.

A12. The method of clause A11, wherein the first and second photodetectors photodiodes are disposed relative to one another such that (i) a footprint of the first return signal covers the first and second photodetectors photodiodes and (ii) a footprint of the second return signal covers the first photodetector photodiode but not the second photodetectorphotodiode.

A13. The method of clause A11 or A12, wherein the first and second photodetectors photodiodes are disposed on and electrically coupled to a circuit board.

A14. The method of any of clauses A11 to A13, wherein the first return signal comprises a dazzle signal, and wherein the second return signal comprises a reflection of an optical signal emitted into an environment outside the lidar device.

A15. The method of any of clauses A11 to A14, wherein the reflection is received from an object that is positioned from about 0.1 m to about 0.6 m away from the lidar device.

A16. The method of any of clauses A11 to A15, wherein the dazzle signal comprises a reflection or scattering of an optical signal off a component inside the lidar device.

A17. The method of any of clauses A11 to A16, wherein the first photodetector photodiode comprises a first anode and a first cathode, wherein the second photodetector photodiode comprises a second anode and a second cathode, wherein the first cathode is electrically coupled to a positive voltage, wherein the second anode is electrically coupled to a negative voltage, and wherein the first anode is electrically coupled to the second cathode.

A18. The method of any of clauses A11 to A17, wherein the amplifier is electrically coupled to the first anode.

A19. The method of any of clauses A11 to A18, wherein the third electrical current corresponds to the second return signal.

A20. The method of any of clauses A11 to A19, wherein the amplifier comprises a transimpedance amplifier, and wherein the method further comprises outputting from the transimpedance amplifier a voltage corresponding to the second return signal.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A lidar device comprising:

at least one far-field transmitter configured to emit optical signals as tightly focused beams, the at least one far-field transmitter being structured and arranged to scan a field of view (FOV) of the lidar system with the tightly focused beams;

a near-field transmitter structured and arranged to emit a diffuse flash beam optical signal separately and distinctly from the tightly focused beams emitted by the at least one far-field transmitter; and a receiver configured to receive return signals based on the optical signals emitted by both the far-field and the near-field transmitters, the receiver comprising:

a first photodetector configured to (i) receive a dazzle signal arising from internal reflections and a valid return signal reflected from an object in the environment, and (ii) generate a first electrical current in response to the dazzle signal and the valid return signal;

a second photodetector configured to (i) receive the dazzle signal but not the valid return signal and (ii) generate a second electrical current in response to the dazzle signal; and an amplifier configured to receive a third electrical current equal to a difference between the first electrical current and the second electrical current, wherein the lidar device is configured to detect objects positioned from about 0.1 meters to about 0.6 meters from the device in response to the return signals generated by the near-field transmitter.

2. The lidar device of claim 1, wherein the first and second photodetectors are avalanche photodiodes or p-i-n junction (PIN) photodiodes.

3. The lidar device of claim 1, wherein the first and second photodetectors are disposed relative to one another such that (i) a footprint of the first return signal covers the first and second photodetectors and (ii) a footprint of the second return signal covers the first photodetector but not the second photodetector.

4. The lidar device of claim 1, wherein the first and second photodetectors are disposed on and electrically coupled to a circuit board.

5. The lidar device of claim 1, wherein the dazzle signal comprises a reflection or scattering of an optical signal off a component inside the lidar device.

6. The lidar device of claim 1, wherein the first photodetector comprises a first anode and a first cathode, wherein the second photodetector comprises a second anode and a second cathode, wherein the first cathode is electrically coupled to a positive voltage, wherein the second anode is electrically coupled to a negative voltage, and wherein the first anode is electrically coupled to the second cathode.

7. The lidar device of claim 6, wherein the amplifier is electrically coupled to the first anode.

8. The lidar device of claim 1, wherein the third electrical current corresponds to the second return signal.

9. The lidar device of claim 1, wherein the amplifier comprises a transimpedance amplifier configured to output a voltage corresponding to the second return signal.

10. The lidar device of claim 1, wherein the near-field transmitter is configured to emit the diffuse flash beam once each time the far-field transmitter scans the field of view.

11. The lidar device of claim 1, wherein the diffuse flash beam emitted by the near-field transmitter has a greater optical divergence and lower energy density than the beams emitted by the far-field transmitter and the near-field transmitter is structured and arranged such that the diffuse flash beam substantially fills both the horizontal and vertical field of view of the lidar device.

12. The lidar device of claim 11, wherein the at least one far-field transmitter comprises an array of far-field transmitters, each emitting a tightly focused optical beam, and wherein the array is configured to scan the entire field of view by emitting the tightly focused beams sequentially or in parallel to different portions of the field of view.

13. A lidar method comprising:

providing a lidar device comprising:

a transmitter configured to transmit optical signals; and a receiver configured to receive return signals based on the optical signals, the receiver comprising a first photodetector, a second photodetector, and an amplifier;

receiving, at the first photodetector, a first return signal and a second return signal;

generating, at the first photodetector, a first electrical current in response to the first return signal and the second return signal;

receiving, at the second photodetector, the first return signal but not the second return signal;

generating, at the second photodetector, a second electrical current in response to the first return signal; and receiving, at the amplifier, a third electrical current equal to a difference between first electrical current and the second electrical current;

wherein the first return signal comprises a dazzle signal, and the second return signal comprises a reflection of an optical signal emitted into an environment outside the lidar device and received from an object positioned from about 0.1 m to about 0.6 m away from the lidar device.

14. The method of claim 13, wherein the first and second photodetectors are disposed relative to one another such that (i) a footprint of the first return signal covers the first and second photodetectors and (ii) a footprint of the second return signal covers the first photodetector but not the second photodetector.

15. The method of claim 13, wherein the first and second photodetectors are disposed on and electrically coupled to a circuit board.

16. The method of claim 13, wherein the dazzle signal comprises a reflection or scattering of an optical signal off a component inside the lidar device.

17. The method of claim 13, wherein the first photodetector comprises a first anode and a first cathode, wherein the second photodetector comprises a second anode and a second cathode, wherein the first cathode is electrically coupled to a positive voltage, wherein the second anode is electrically coupled to a negative voltage, and wherein the first anode is electrically coupled to the second cathode.

18. The method of claim 17, wherein the amplifier is electrically coupled to the first anode.

19. The method of claim 13, wherein the third electrical current corresponds to the second return signal.

20. The method of claim 13, wherein the amplifier comprises a transimpedance amplifier, and wherein the method further comprises outputting from the transimpedance amplifier a voltage corresponding to the second return signal.

* * * * *